United States Patent
Kim et al.

(10) Patent No.: US 9,628,237 B2
(45) Date of Patent: Apr. 18, 2017

(54) METHOD AND DEVICE FOR MONITORING DOWNLINK CONTROL CHANNEL IN WIRELESS COMMUNICATION SYSTEM

(71) Applicant: LG ELECTRONICS INC., Seoul (KR)

(72) Inventors: Hakseong Kim, Seoul (KR); Hanbyul Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 14/437,162

(22) PCT Filed: Oct. 21, 2013

(86) PCT No.: PCT/KR2013/009390
§ 371 (c)(1),
(2) Date: Apr. 20, 2015

(87) PCT Pub. No.: WO2014/062041
PCT Pub. Date: Apr. 24, 2014

(65) Prior Publication Data
US 2015/0304086 A1    Oct. 22, 2015

Related U.S. Application Data

(60) Provisional application No. 61/716,609, filed on Oct. 21, 2012, provisional application No. 61/721,450, (Continued)

(51) Int. Cl.
*H04W 4/00* (2009.01)
*H04L 5/00* (2006.01)
(Continued)

(52) U.S. Cl.
CPC ......... *H04L 5/0053* (2013.01); *H04B 17/391* (2015.01); *H04L 5/001* (2013.01);
(Continued)

(58) Field of Classification Search
CPC .................... H04W 74/0833; H04L 5/0053
(Continued)

(56) References Cited

U.S. PATENT DOCUMENTS

2012/0069802 A1    3/2012  Chen et al.
2012/0182950 A1*   7/2012  Chung ................. H04L 5/0053
                                                         370/329

(Continued)

FOREIGN PATENT DOCUMENTS

CN         102668669 A      9/2012
WO      WO 2011/063244 A2   5/2011
(Continued)

*Primary Examiner* — Iqbal Zaidi
(74) *Attorney, Agent, or Firm* — Birch, Stewart, Kolasch & Birch, LLP

(57) ABSTRACT

A method and device for monitoring a control channel in a wireless communication system are provided. In particular, in consideration of multiple carrier aggregation, indication information is provided which includes information on a cell for monitoring a downlink control channel and information on a channel type defined to identify whether a downlink control channel to be transmitted from a corresponding cell is a legacy PDCCH (LPDCCH) or an enhanced PDCCH (EPDCCH). The indication information may be set in consideration of whether to arrange cross carrier scheduling. Thus, a terminal uses the indication information to adaptively monitor LPDCCH and/or EPDCCH through a predetermined search section of a corresponding cell. Thus, it is possible to adaptively schedule a downlink control channel and an enhanced downlink control channel.

10 Claims, 20 Drawing Sheets

Related U.S. Application Data filed on Nov. 1, 2012, provisional application No. 61/721,515, filed on Nov. 2, 2012, provisional application No. 61/726,519, filed on Nov. 14, 2012.

(51) Int. Cl.
    *H04B 17/391*     (2015.01)
    *H04W 72/04*     (2009.01)

(52) U.S. Cl.
    CPC ......... *H04L 5/0098* (2013.01); *H04W 72/042* (2013.01); *H04L 5/0023* (2013.01)

(58) Field of Classification Search
    USPC .................................................. 370/311–339
    See application file for complete search history.

(56) References Cited

U.S. PATENT DOCUMENTS

| | | | |
|---|---|---|---|
| 2013/0022005 A1* | 1/2013 | Yano | H04L 1/0046 370/329 |
| 2013/0215853 A1 | 8/2013 | Li et al. | |
| 2015/0092713 A1 | 4/2015 | Pelletier et al. | |

FOREIGN PATENT DOCUMENTS

| | | |
|---|---|---|
| WO | WO 2011/126100 A1 | 10/2011 |
| WO | WO 2011/132960 A2 | 10/2011 |
| WO | WO 2012/040901 A1 | 4/2012 |

\* cited by examiner

FIG. 13

|  | Pcell | Scell1 | Scell2 |
|---|---|---|---|
| Required bit | existing 1bit bitmap | new 2bit | new 2bit |
| Usage | L/E on P | L/E on S<br>L/E on P | L/E on S<br>L/E on P |

⎱ 1310

|  | Pcell | Scell1 | Scell2 |
|---|---|---|---|
| Required bit | existing 1bit bitmap | existing 1bit bitmap+new 1bit | existing 1bit bitmap+new 1bit |
| Usage | L/E on P | L/E on S<br>L/E on P | L/E on S<br>L/E on P |

|  | BW1 | BW2 | BW3 |
|---|---|---|---|
| time=0 | E on P | E1 on S1 | E2 on S2 |

⎫ 1710

| time=K | E, [E1], [E2] on P | None | None |
|---|---|---|---|

⎫ 1720

| time=K | [E], [E1], [E2] on P | None | None |
|---|---|---|---|

⎫ 1730

METHOD AND DEVICE FOR MONITORING DOWNLINK CONTROL CHANNEL IN WIRELESS COMMUNICATION SYSTEM

CROSS REFERENCE TO RELATED APPLICATIONS

This application is the National Phase of PCT/KR2013/009390 filed on Oct. 21, 2013, which claims priority under 35 U.S.C. 119(e) to U.S. Provisional Application Nos. 61/716,609 filed on Oct. 21, 2012; 61/721,450 filed on Nov. 1, 2012; 61/721,515 filed on Nov. 2, 2012; and 61/726,519 filed on Nov. 14, 2012, all of which are hereby expressly incorporated by reference into the present application.

BACKGROUND OF THE INVENTION

Field of the Invention

The present invention concerns wireless communications, and more specifically, to methods and apparatuses for monitoring downlink control channels in a wireless communication system supportive of multiple component carriers.

Related Art

3GPP (3rd Generation Partnership Project) TS (Technical Specification) Release 8-based LTE (long term evolution) is a key next-generation communication standard. Recently, standardization is underway for LTE-A (LTE-advanced) based on 3GPP TS release 10.

As set forth in 3GPP TS 36.211 V10.2.0 (June 2011) "Evolved Universal Terrestrial Radio Access (E-UTRA); Physical Channels and Modulation (Release 10)," physical channels in 3GPP LTE/LTE-A systems may be divided into downlink channels such as PDSCH (Physical Downlink Shared Channel) and PDCCH (Physical Downlink Control Channel) and uplink channels such as PUSCH (Physical Uplink Shared Channel) and PUCCH (Physical Uplink Control Channel).

Various technologies for increasing transmission capacity of mobile communication systems are under discussion in order to deal with increasing data traffic. For example, techniques such as MIMO (Multiple Input Multiple Output) using multiple antennas and carrier aggregation supporting multiple cells are being introduced.

The control channel designed in the above-mentioned 3GPP LTE/LTE-A standard carries various control information. Here, a need exists for a specific scheme to provide flexible scheduling while increasing the capacity of control channels to keep up with new technologies.

SUMMARY OF THE INVENTION

The present invention provides a method for monitoring downlink control channels in a wireless communication system and an apparatus using the same.

Further, the present invention provides a method and apparatus for identifying indication information obtained by combining information on a cell and channel type information for monitoring downlink control channels.

In an aspect, a control channel monitoring method in a wireless communication system is provided. The method comprises receiving indication information including channel type information on a downlink control channel and information on a cell for monitoring the corresponding downlink control channel, by a user equipment (UE) and identifying the indication information and monitoring a downlink control channel determined by the identified indication information in a corresponding cell, by the UE, wherein the indication information is defined with a length varying depending on a configuration of cross carrier scheduling.

In another aspect, a user equipment (UE) monitoring a control channel in a wireless communication system comprises an RF (radio frequency) unit transmitting and receiving a radio signal and a processor connected with the RF unit. The processor connected with the RF unit includes performing control to identify indication information including channel type information on a downlink control channel and information on a cell for monitoring the corresponding downlink control channel and monitor a downlink control channel determined by the identified indication information in a corresponding cell. The indication information is defined with a length varying depending on a configuration of cross carrier scheduling.

The bitstream may adaptively and flexibly schedule downlink control channels and extended downlink control channels. The UE may receive control channels more exactly and more efficiently by monitoring a plurality of downlink control channels in a single sub-frame through a corresponding serving cell.

BRIEF DESCRIPTION OF THE DRAWINGS

FIG. 13 is a view schematically illustrating a configuration of RRC signaling according to the present invention.

FIGS. 17 and 18 are views schematically illustrating a search parameter set for monitoring a control channel upon performing cross carrier scheduling according to the present invention.

DETAILED DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-A based on 3GPP TS release 10. However, this is for exemplary purposes only, and thus the present invention is also applicable to various wireless communication network.

Figure 1:
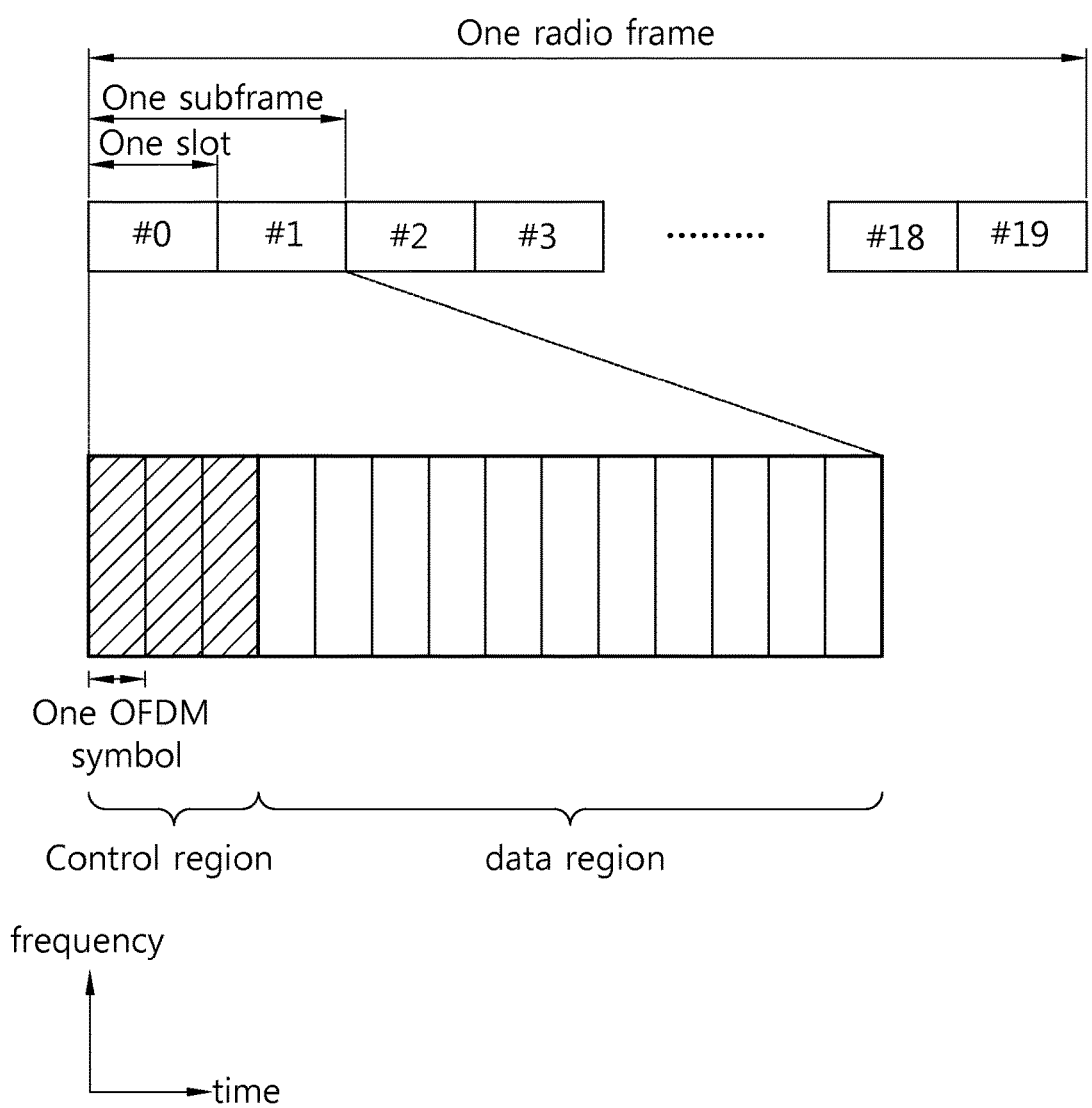
FIG. 1 illustrates the structure of a downlink radio frame to which the present invention applies.

FIG. 1 shows a structure of a DL radio frame in 3GPP LTE-A. The section 6 of 3GPP TS 36.211 V10.2.0 (June 2011) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As described in 3GPP TS 36.211 V 10.2.0, in 3GPP LTE/LTE-A, a physical channel can be divided into a data channel (e.g., a physical downlink shared channel (PDSCH) and a physical uplink shared channel (PUSCH)) and a control channel (e.g., a physical downlink control channel (PDCCH), a physical control format indicator channel (PCFICH), a physical hybrid-ARQ indicator channel (PHICH), and a physical uplink control channel (PUCCH)).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH. Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
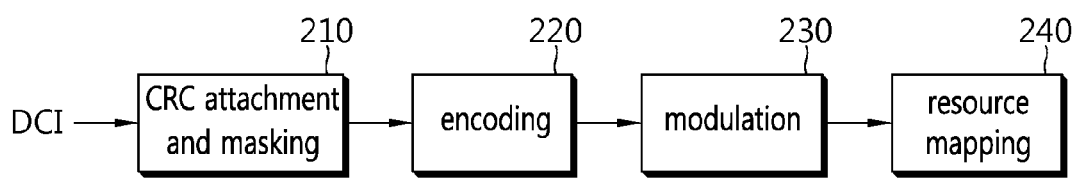
FIG. 2 is a block diagram illustrating a configuration of a PDCCH to which the present invention applies.

FIG. 2 shows a structure of a PDCCH.

3GPP LTE/LTE-A adopts blind decoding to detect PDCCH. Blind decoding demasks a desired identifier to the CRC of a PDCCH received (this is denoted a candidate PDCCH) and checks the CRC error to identify whether the PDCCH is its control channel or not.

A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data. Encoding includes channel encoding and rate matching.

The coded data is modulated to generate modulation symbols.

The modulation symbols are mapped to physical resource elements (REs). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level. The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
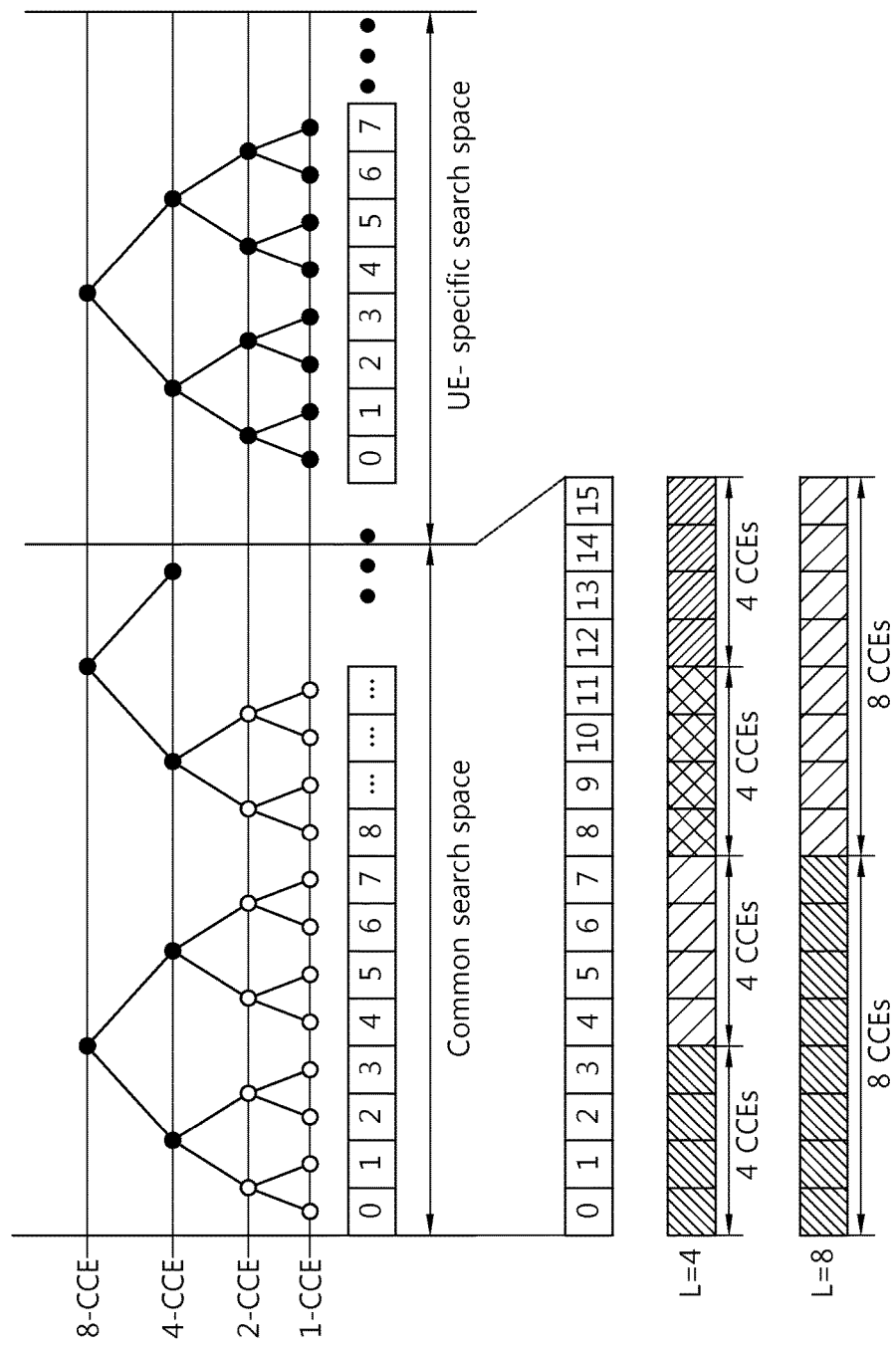
FIG. 3 is a view illustrating an example of PDCCH monitoring to which the present invention applies.

FIG. 3 shows an example of monitoring a PDCCH. The section 9 of 3GPP TS 36.213 V10.2.0 (June 2011) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission. A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1, 2, 3, 4}, a search space S(L) k is defined as a set of PDCCH candidates. A CCE corresponding to a PDCCH candidate m of the search space S(L) k is given by Equation 1 below.

$$L \cdot \{(Y_k + m') \bmod \lfloor N_{CCE,k}/L \rfloor\} + i \quad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the UE, m'=m+$M^{(L)}n_{cif}$. Herein, $n_{cif}$ is a value of the CIF. If the CIF is not set to the UE, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1}=n_{RNTI1}\neq 0$, A=39827, D=65537, k=floor($n_s$/2), and $n_s$ denotes a slot number in a radio frame.

Now, a channel state report in 3GPP LTE will be described.

Figure 4:
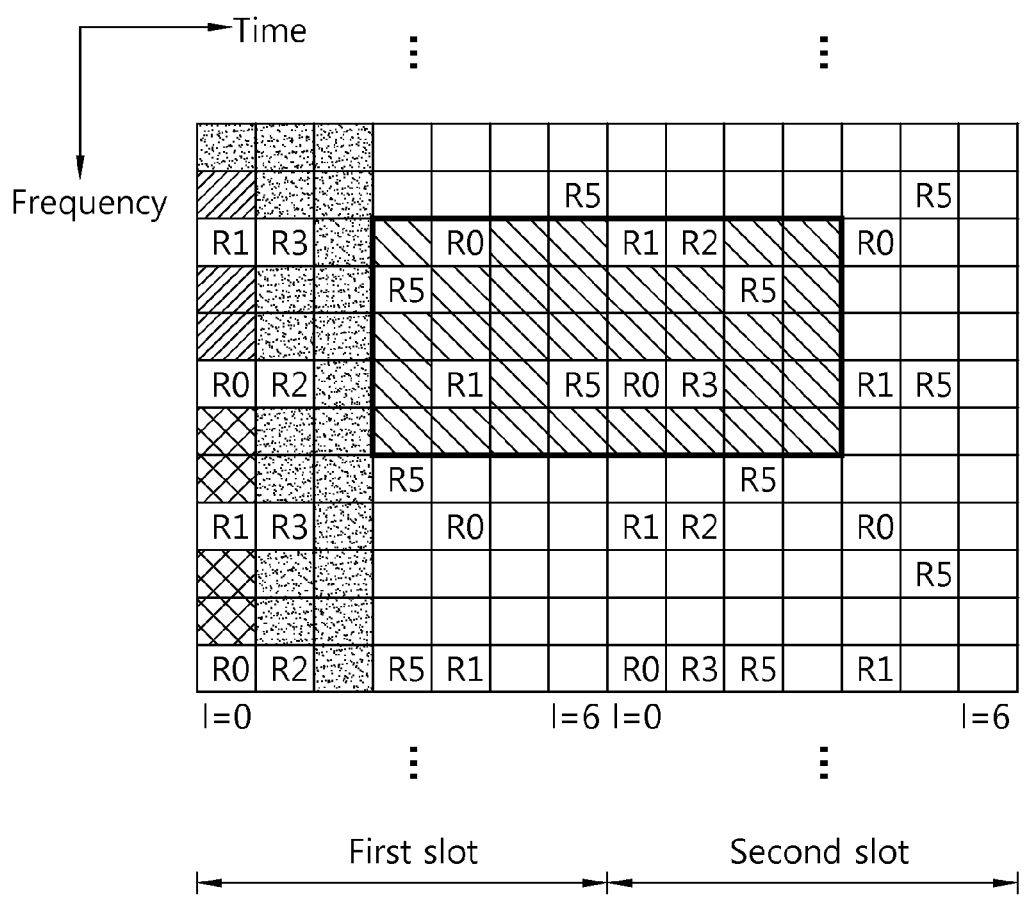
FIG. 4 illustrates an example in which a reference signal and a control channel are arranged in a DL sub-frame to which the present invention applies.

FIG. 4 illustrates an example in which a reference signal and a control channel are arranged in a DL sub-frame to which the present invention applies.

Referring to FIG. 4 the control region (or PDCCH region) of the downlink sub-frame includes three first OFDM symbols, and the data region where a PDSCH is transmitted includes the remaining three OFDM symbols. A PCFICH, a PHICH, and/or a PDCCH are transmitted in the control region. The CFI of the PCFICH includes indicating three OFDM symbols. The region except the resource where the PCFICH and/or PHICH are transmitted in the control region is a PDCCH region where monitors the PDCCH.

Various reference signals are transmitted in the sub-frame as well. Specifically, a CRS (cell-specific reference signal) may be received by all the UEs in a cell, and the CRS is transmitted over an entire downlink frequency band. In the drawings, 'R0' indicates an RE (resource element) where a CRS for a first antenna port is transmitted, 'R1' an RE where a CRS for a second antenna port is transmitted, 'R2' an RE where a CRS for a third antenna port is transmitted, and 'R3' an RE where a CRS for a fourth antenna port is transmitted.

The RS sequence $r_{l,ns}(m)$ for CSR is defined as follows:

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Here, m=0, 1, ..., $2N_{maxRB}-1$, $N_{maxRB}$ the maximum number of RBs, ns a slot number in the radio frame, l an OFDM symbol number in the slot.

Pseudo-random sequence c(i) is defined by a gold sequence whose length is 31 as follows:

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$  [Equation 4]

Here, Nc=1,600, and the first m-sequence is initialized as $x^1(0)=1$, $x_1(n)=0$, m=1, 2, ..., 30.

The second m-sequence is initialized as $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is the PCI (physical cell identity) of the cell: for normal CP, $N_{CP}=1$, and for extended CP, $N_{CP}=0$.

A URS (UE-specific Reference Signal) is transmitted in the sub-frame. While the CRS is transmitted in an overall sub-frame, the URS is transmitted in the data region of a sub-frame. The URS is used for demodulating a corresponding PDSCH. In Table 4 above, denotation R5 indicates the RE where the URS is transmitted. The URS is also referred to as a DRS (dedicated Reference Signal) or DM-RS (Demodulation Reference Signal). The URS is transmitted in only the RB mapped with a corresponding PDSCH. In the drawings, R5's are marked off the region where PDSCH is transmitted in order to indicate the positions of REs to which the URSs are mapped.

The URS is used by only the UE receiving the corresponding PDSCH. The RS sequence $r_{ns}(m)$ for the URS is the same as Equation 3. Here, m=0, 1, ..., $12N_{PDSCH,RB}-1$, and $N_{PDSCH,RB}$ is the number of RBs where the corresponding PDSCH is transmitted. The pseudo random sequence generator is initialized as $c_{init}=(\text{floor}(ns/2)+1)(2N^{cell}_{ID}+1)2^{16}+n_{RNTI}$ at the start of each sub-frame. $n_{RNTI}$ is the identifier of the UE.

The above is for the case where the URS is transmitted through a single antenna, and when the URS is transmitted through multiple antennas, the pseudo random sequence generator is initialized as $c_{init}=(\text{floor}(ns/2)+1)(2N^{cell}_{ID}+1)2^{16}+n_{RNTI}$ at the start of each sub-frame. nSCID is a parameter obtained from a DL grant (e.g., DCI format 2B or 2C) related to PDSCH transmission.

Meanwhile, a PDCCH is monitored in a limited region, e.g., control region, of a sub-frame, and demodulation of a PDCCH uses a CRS that is transmitted in an overall band. Diversified control information types and increased control information reduce the flexibility in scheduling using legacy PDCCHs alone. To reduce overhead that occurs due to transmission of CRSs, EPDCCHs (enhanced PDCCHs) have been adopted.

Figure 5:
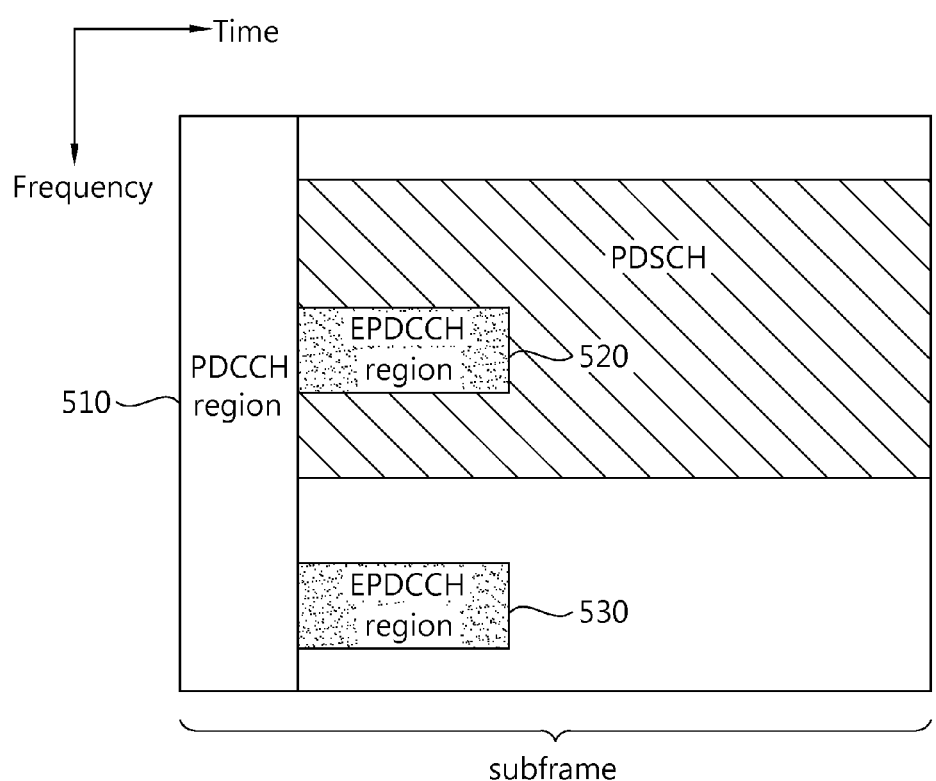
FIG. 5 illustrates an example of a sub-frame with an EPDCCH to which the present invention applies.

FIG. 5 illustrates an example of a sub-frame with an EPDCCH to which the present invention applies.

A sub-frame may include zero or one PDCCH region 510 and zero or more EPDCCH regions 520 and 530.

The EPDCCH regions 520 and 530 are regions where the UE monitors EPDCCHs. The PDCCH region 510 is positioned in first four OFDM symbols to the maximum in the sub-frame, but this may be varied depending on the number of symbols defined by the PCFICH. Meanwhile, the EPDCCH regions 520 and 530 may be flexibly scheduled in the OFDM symbols positioned subsequent to the PDCCH region 510.

One or more EPDCCH regions 520 and 530 may be designated in the UE, and the UE may monitor EPDCCH in the designated EPDCCH regions 520 and 530.

The number/position/size of the EPDCCH regions 520 and 530, and/or information regarding a sub-frame to monitor the EPDCCHs may be informed by the base station to the UE through, e.g., an RRC message.

In the PDCCH region 510, the PDCCH may be demodulated based on a CRS. In the EPDCCH regions 520 and 530, a DM (demodulation) RS, not a CRS, may be defined for demodulation of the EPDCCHs. The associated DM-RS may be transmitted in its corresponding EPDCCH region 520 and 530.

The RS sequence $r_{ns}(m)$ for the associated DM RS is the same as Equation 3. Here, m=0, 1, ..., $12N_{RB}-1$, and $N_{RB}$ is the maximum number of RBs. The pseudo random sequence generator may be initialized as $c_{init}=(\text{floor}(ns/2)+1)(2N_{EPDCCH,ID}+1)2^{16}+n_{EPDCCH,SCID}$ at the start of each sub-frame. ns is a slot number in the radio frame, $N_{EPDCCH,ID}$ is a cell index related to a corresponding EPDCCH region, and $n_{EPDCCH,SCID}$ is a parameter given from a higher layer signaling.

Each EPDCCH region 520 and 530 may be used in scheduling for different cells. For example, the EPDCCH in the EPDCCH region 520 may carry scheduling information for a primary cell, and the EPDCCH in the EPDCCH region 530 may carry scheduling information for a secondary cell.

When the EPDCCHs in the EPDCCH regions 520 and 530 are transmitted through multiple antennas, the DM-RSs in the EPDCCH regions 520 and 530 may be subjected to the same precoding as the EPDCCHs.

As compared with PDCCHs that adopt CCEs as their units for transmission, EPDCCHs use ECCEs (Enhanced Control Channel Elements) as their units for transmission. Aggregation levels may be defined in units of resources to monitor EPDCCHs. For example, assuming that one ECCE is a minimum resource for an EPDCCH, aggregation levels L={1, 2, 4, 8, 16} may be defined.

Hereinafter, a search space may correspond to an EPDCCH region. In the search space, one or more EPDCCH candidates may be monitored every one or more aggregation levels.

Now described is resource allocation for EPDCCHs.

An EPDCCH is transmitted using one or more ECCEs. The ECCE includes a plurality of EREGs (Enhanced Resource Element Groups). Depending on the CP or sub-frame type according to TDD (Time Division Duplex) DL-UL configurations the ECCE may include four EREGs or eight EREGs. For example, for normal CP, the ECCE may include four EREGs, and for extended CP, the ECCE may include eight EREGs. Here, a PRB (Physical Resource Block) pair refers to two PRBs with the same RB number in one sub-frame. The PRB pair may include the first PRB of the first slot in the same frequency domain and the second PRB of the second slot in the frequency domain. For normal CP, the PRB pair includes twelve sub-carriers and fourteen OFDM symbols, thus 168 REs (resource elements).

Meanwhile, a method for monitoring EPDCCHs is described.

As described above, since an EPDCCH region, unlike the fixed PDCCH region, may be dynamically configured in a particular physical resource region, information on the EPDCCH region needs to be informed to a corresponding UE.

The control information transmitted on an EPCFICH may be referred to as an ECFI (Enhanced Control Format Indicator) or identification information, and the ECFI may contain information on one or more EPDCCH regions. An EPDCCH region corresponds to one search space where an EPDCCH is monitored, and is also referred to as an EPDCCH set. As described above, an EPDCCH region includes one or more PRB pairs (or PRBs). For example, the ECFI may contain at least one of the following fields.

TABLE 2

| Field | Details |
| --- | --- |
| Identifier | identifier of EPDCCH set (or also denoted EPDCCH set index) |
| transmission type | indicates distributed transmission or localized transmission |
| PB allocation | PRB pair for EPDCCH set |
| PUCCH offset | offset for PUCCH resource |
| RS scramble identifier | scrambling sequence initialization parameter for EPDCCH |

The above field names are mere examples, and the information may be indicated with one field. Required is an EPCFICH structure considering the probability that other signals in a particular sub-frame (e.g., a CRS, DM RS, CSI-RS, sync signal, PBCH, etc.) along with a PDSCH and EPDCCH in a sub-frame.

As if, upon EPDCCH RE mapping, rate-matching or puncturing is performed given the existence of other signals, EPCFICH RE mapping also needs to consider the existence of other signals.

Meanwhile, a wireless communication system to which the present invention applies may be a carrier aggregation system. Hereinafter, a carrier aggregation system is described. 3GPP LTE/LTE-A systems are supportive of configurations in which a downlink bandwidth is different from an uplink bandwidth, which, however, assumes a single component carrier. Such 3GPP LTE-A system supports up to 20 MHz on one CC and may be supportive of a plurality of CCs, which are called spectrum aggregation (or also denoted bandwidth aggregation or carrier aggregation). For example, allocation of five CCs each with a carrier bandwidth granularity of 20 MHz would support a bandwidth up to 100 MHz.

Here, one DL CC (or a pair of downlink CC and uplink CC) may correspond to one cell. Accordingly, a UE communicating with a base station through a plurality of DL CCs in the 3GPP LTE-A system may be said to be served from a plurality of serving cells.

Figure 6:
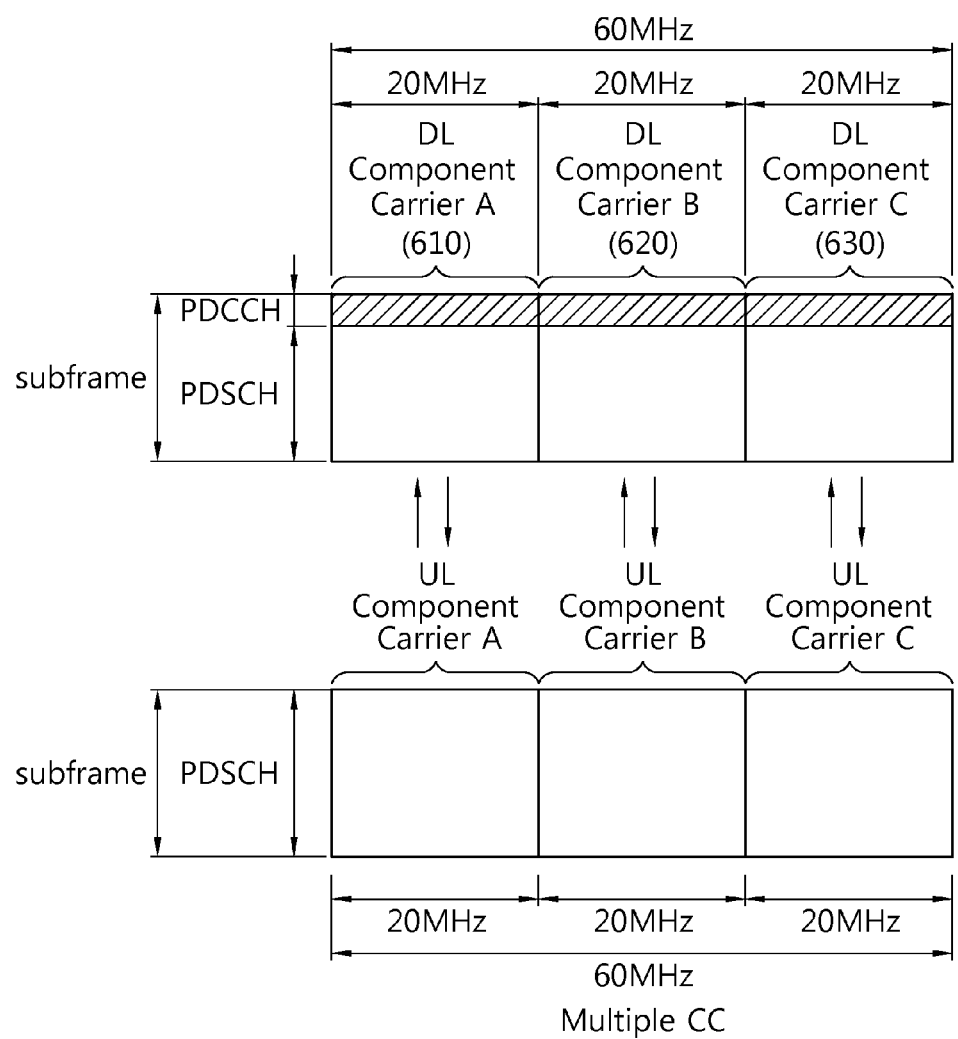
FIG. 6 is a view schematically illustrating the concept of carrier aggregation to which the present invention applies.

FIG. 6 is a view schematically illustrating the concept of a carrier aggregation system to which the present invention applies.

Referring to FIG. 6, three DL CCs and three UL CCs are shown, but this is a mere example. The number of DL CCs and UL CCs is not limited. A PDCCH and a PDSCH are independently transmitted on each DL CC, and a PUCCH and a PUSCH are independently transmitted on each UL CC. Since three DL CC-UL CC pairs are defined, a UE may be considered to be served from three serving cells.

Accordingly, the UE may monitor the DL CCs and the PDCCHs and the UE may receive DL transport blocks through the plurality of DL CCs. The UE may simultaneously transmit a plurality of UL transport blocks through the plurality of UL CCs.

Assume that a pair of DL CC #1 and UL CC #1 is a first serving cell, a pair of DL CC #2 and UL CC #2 a second serving cell, and DL CC #3 a third serving cell. Each serving cell may be identified through its cell index (CI). The CI may be unique to its corresponding cell or may be UE-specific. An example is here shown in which the first to third serving cells are allowed CI=0(610), 1(620), 2(630).

Meanwhile, the serving cells may be divided into a primary cell (PSC) and secondary cells (SSCs).

The PSC is a cell that operates at a primary frequency and that establishes the UE's initial connection or initiates a connection reestablishment process or is indicated as primary during a handover process. The PSC is also denoted a reference cell or Pcell and may be fully in charge of control channel-based uplink control information (UCI) transmission for a plurality of serving cells. The UCI includes, e.g., a HARQ ACK/NACK (acknowledgement/not-acknowledgement) and CSI (channel state information).

In contrast, the SSC may operate at a secondary frequency and may be configured after an RRC connection has been established. The secondary cells may be used to provide additional radio resources. At least one PSC is always configured, and SSC(s) may be added/modified/released by higher layer signaling. The cell index (CI) of the PSC may be fixed. For example, the lowest CI may be designated as the CI of the PSC. Hereinafter, assume that the CI of the primary cell is 0, and the CIs of the SSCs are sequentially assigned 1 to subsequent numbers. The CIs of the SSC may be defined as 1 through 7.

The carrier aggregation system may support non-cross carrier scheduling and cross carrier scheduling.

Non-cross carrier scheduling is a scheduling method in which a PDSCH and a PDCCH scheduling the PDSCH are transmitted through the same downlink CC. In this scheduling method, further, the downlink CC where a PDCCH scheduling a PUSCH is transmitted is basically lined with the uplink CC where the PUSCH is transmitted.

In contrast, cross carrier scheduling is a scheduling method in which, through a PDCCH transmitted through a particular component carrier (i.e., a particular serving cell), a PDSCH transmitted through other component carrier may be assigned resources.

Figure 7:
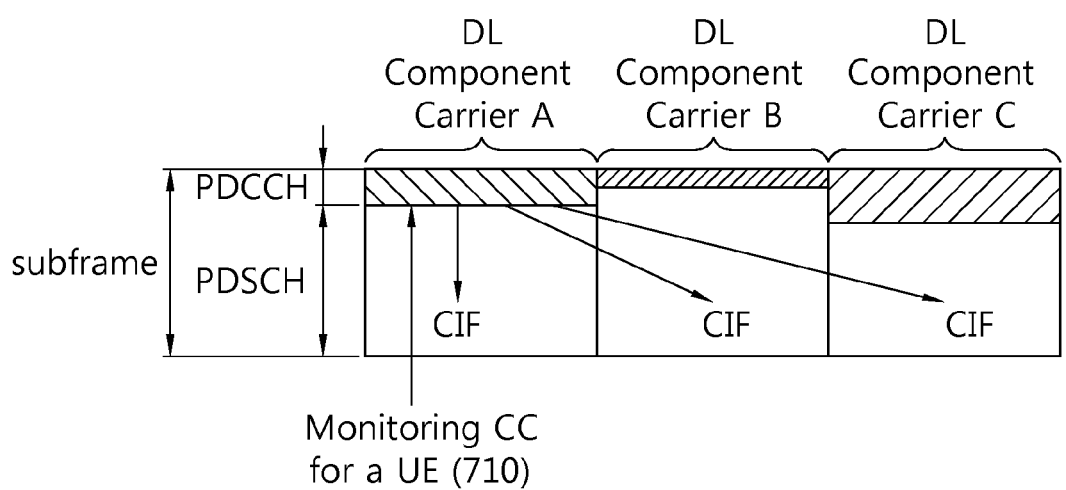
FIG. 7 is a view schematically illustrating cross carrier scheduling in a carrier aggregation system to which the present invention applies.

FIG. 7 is a view schematically illustrating cross-carrier scheduling in a carrier aggregation system to which the present invention applies.

Referring to FIG. 7, three DL CCs (DL CC A, DL CC B, DL CC C) are aggregated, and DL CC A may be set to a PDCCH monitoring DL CC. The UE may receive, through the PDCCH of DL CC A, downlink grants for PDSCHs of DL CC A, DL CC B, and DL CC C. The DCI transmitted through the PDCCH of DL CC A contains a CIF to indicate which one of the DL CCs the DCI is for (710). Here, DL CC A may be a primary cell, and DL CCB and DL CC C may be secondary cells. As shown in FIG. 7, upon cross carrier scheduling, the PDCCHs for the same sub-frames in different cells are transmitted through a particular cell.

As described above, cross carrier scheduling is a scheduling method that enables resource allocation of the PUSCH transmitted through other component carriers than component carriers basically linked with a corresponding particular component carrier through the PDCCH transmitted through the particular component carrier. In other words, the PDCCH and PDSCH may be transmitted through different downlink CCs, and the PUSCH corresponding to the UL grant may be transmitted through an uplink CC other than the uplink CC linked with the downlink CC where the PDCCH including the UL grant has been transmitted. A system supportive of cross carrier scheduling needs a carrier indicator indicating the DL CC/UL CC through which the PDSCH/PUSCH to which the PDCCH provides control information is transmitted. The field including such carrier indicator is denoted a carrier indication field (CIF).

Upon cross carrier scheduling, the particular component carrier configured to allow a PDCCH to be transmitted upon scheduling (this is denoted a PDCCH cell for convenience) may contain the PSC, at least. In other words, this means that the PDCCH cell is configured with only PSCs or that in some cases the PDCCH cell may include a particular SSC along with the PSC. For example, assuming that CC1 is a PSC under the circumstance that five serving cells CC1 to CC5 are allocated, upon cross carrier scheduling, the PDCCH cell for CC1 and CC2 may be set to CC1, the PSC, and the PDCCH cell for CC3, CC4, and CC5 may be set to CC3, the particular SSC.

Although the PDCCH cell and the PSC are collectively referred to as primary cell according to the present invention, the primary cell represented in association with cross carrier scheduling means a PDCCH cell (which includes a primary cell as well).

Upon cross carrier scheduling, the bitstream may configure a PDCCH monitoring DL CC set. The PDCCH monitoring DL CC set consists of some of all the DL CCs aggregated, and if cross carrier scheduling is set, the UE performs PDCCH monitoring/decoding only on the DL CCs included in the PDCCH monitoring DL CC set. The PDCCH monitoring DL CC set may be configured UE-specifically, UE group-specifically, or cell-specifically.

As described above, the communication environment supportive of multiple CCs may provide scheduling flexibility by using legacy PDCCHs (legacy PDCCHs, LPDCCHs), i.e., by configuring additional EPDCCHs according to increased control information. In this case, the LPDCCH and newly applied EPDCCH are independently configured for related parameters depending on their respective purposes and be properly operated according thereto. This includes only a particular control channel being able to be configured under a particular condition. As such, in the environment with multiple control channels, which requires complicated scheduling as per CA, i.e., in the communication environment with multiple downlink control channels, UE behaviors according to various combinations need to be specifically defined. In other words, what control channel should be detected in what sub-frame under what condition to demodulate scheduled data packets should be clearly defined. Here, PCell (Primary Cell) may be defined as a master cell or serving cell, and SCell (Secondary Cell) may be defined as a slave cell or non-serving cell. LPDCCH and EPDCCH, respectively, are distinctly applied to the cases where cross carrier scheduling (CCS) is used and the cases where non-cross carrier scheduling (self scheduling or non-CCS) is used, and operations according to each combination and a signaling method supporting the same are described.

Figure 8:
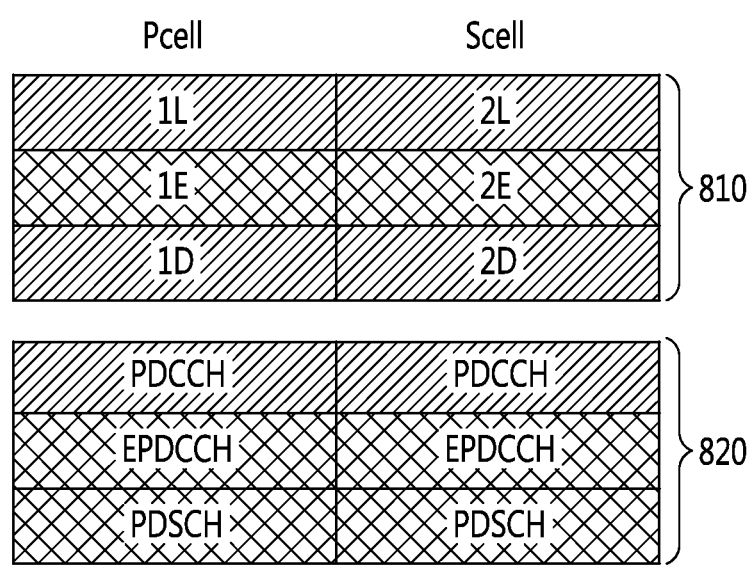
FIG. 8 is a view schematically illustrating the concept of monitoring a downlink control channel according to the present invention.

FIG. 8 is a view illustrating a scheme for monitoring a control channel defined per serving cell according to the present invention. Now described is an example in which two carriers are present for ease of description.

Referring to FIG. 8, 1L or 2L indicates the case where Pcell or Scell schedules PDSCH 1D or 2D using LPDCCH, and 1E or 2E indicates the case where Pcell or Scell schedules PDSCH 1D or 2D using EPDCCH. In FIG. 8, the diagonally lined pattern means the relevance with LPDCCH, and the grid pattern means the relevance with EPDCCH.

810 indicates the state where Pcell and Scell schedule PDSCHs using LPDCCHs, respectively. Accordingly, the UE finally receives the PDSCH by monitoring and receiving the LPDCCH in the search space corresponding to the control region of the sub-frame defined in the Pcell and Scell.

820 indicates the state where Pcell and Scell schedule PDSCHs using EPDCCHs, respectively. Accordingly, the UE receives the PDSCH through the EPDCCH in the EPDCCH region defined in the Pcell and Scell. Here, the UE is in the state of having received information the number/position/size of EPDCCH regions or information on the sub-frame to monitor the EPDCCH through, e.g., an RRC message.

Meanwhile, scheduling on PDSCHs may be performed in the manner that cross carrier scheduling does not apply per cell, i.e., per carrier. This is described in greater detail in connection with FIG. 9.

Figure 9:
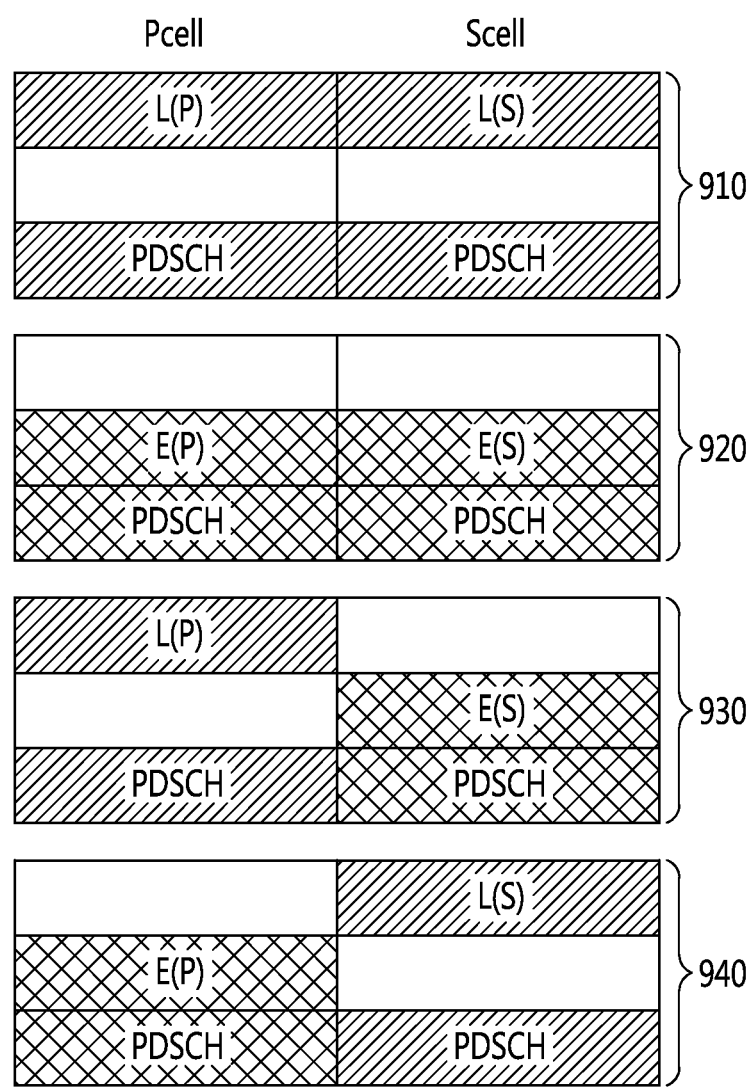
FIG. 9 is a view illustrating an example for monitoring a control channel upon non-cross carrier scheduling according to the present invention.

FIG. 9 illustrates an example of monitoring control channels in case non-cross carrier scheduling, i.e., self scheduling, is performed according to the present invention.

Referring to FIG. 9, 910 indicates a typical example where an LPDCCH (L(P)) transmitted to a Pcell resource region schedules a PDSCH of the Pcell and an LPDCCH (L(S)) transmitted to an Scell resource region schedules a PDSCH of the Scell. 920 indicates an example in which an EPDCCH transmitted to the Pcell schedules a Pcell PDSCH, and an EPDCCH transmitted to the Scell schedules a Scell PDSCH. 930 indicates an example in which an LPDCCH transmitted to the Pcell transmits a PDSCH while an EPDCCH transmitted to the Scell schedules a PDSCH. 940 indicates an example where in the Pcell an E-PDCH, instead of the LPDCCH, schedules a Pcell PDSCH, and in the Scell, the LPDCCH schedules a Scell PDSCH.

Assuming that the above four cases are present, the present invention proposes a scheme to provide a control channel type for performing monitoring in a particular sub-frame in order for the UE to clearly appreciate what control channel in the particular sub-frame should be monitored. In other words, the sub-frame for monitoring the LPDCCH or EPDCCH is rendered to be known so that the EPDCCH detection is attempted and decoding is performed in the sub-frame monitoring the EPDCCH while the LPDCCH is detected in the sub-frame monitoring the LPDCCH. Here, if a control channel is detected from a particular cell, it may be implicitly defined that a PDSCH is scheduled in a corresponding carrier/cell. Or, one or two of the four cases (in case the four are narrowed to two through legacy information) may be explicitly informed.

Figure 10:
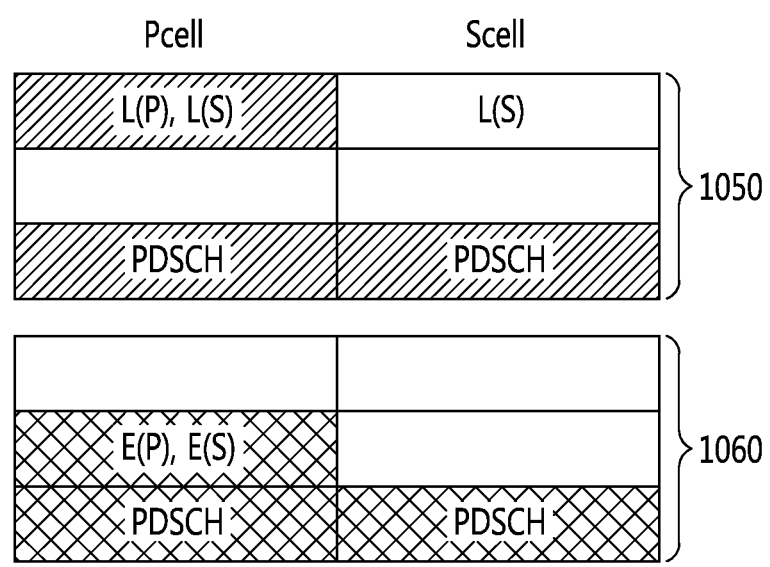
FIGS. 10 and 11 are views illustrating an example for monitoring a component carrier upon cross carrier scheduling according to the present invention.
Figure 11:
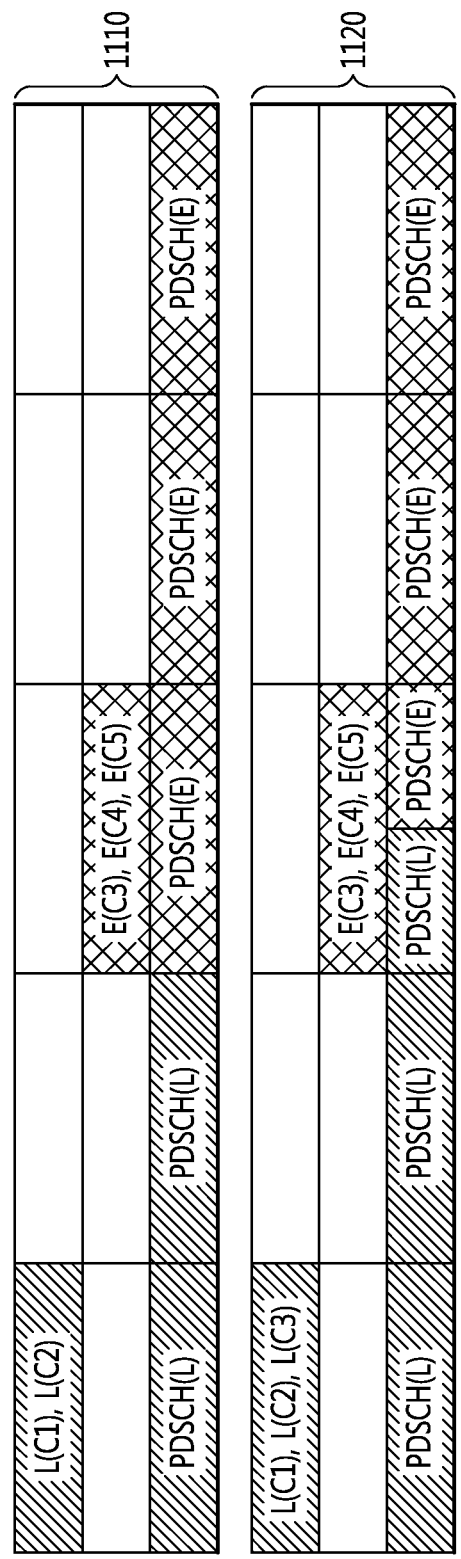

FIGS. 10 and 11 are views illustrating an example for monitoring a component carrier in case cross carrier scheduling is supported according to the present invention.

Referring to FIG. 10, 1050 indicates an example in which two LPDCCHs are configured in the Pcell PDCCH resource region, among which one LPDCCH, L(P) schedules the Pcell PDSCH, and the other LPDCCH, L(S) cross carrier schedules the Scell PDSCH. In contrast, 1060 indicates the case where two EPDCCHs are configured in the Pcell EPDCCH resource region, among which E(P) schedules the Pcell PDSCH and E(S) schedules the Scell PDSCH. According to the present invention, the EPDCCH also supports cross carrier scheduling.

In such case, including the four cases shown in FIG. 9, the UE may have difficulty in appreciating the exact scheduling type. Of course, in case a definition has been made to configure cross carrier scheduling through RRC signaling, 1050 and 1060 may be distinguished with one bit. However, in case the cross carrier scheduling has been configured, the cross carrier scheduling may be released in a particular sub-frame, and the type of scheduling the control channel by the UE may end up and be determined as the four cases shown in FIG. 9. In this case, in case the cross carrier scheduling is released, the operation of the UE may be determined by previously configuring the condition of fallback to one of 910 to 940 of FIG. 9 according to a predetermined rule.

To that end, the present invention proposes a scheme for explicitly signaling which case it is including non-cross carrier scheduling and cross carrier scheduling described above. Accordingly, the present invention defines the six cases shown in FIGS. 9 and 10 through 3-bit signaling and defines the remaining two states as reserved. Here, the four cases for non-cross carrier scheduling may be explicitly defined with a number of bits (e.g., one or two bits) smaller than three bits, and may be implicitly defined to perform a basic operation according to a predetermined rule (that is, signaling+information may be used in the manner that some explicitly distinguish cases while the others implicitly distinguish cases.

Additionally, in case cross carrier scheduling is configured by the LPDCCH or EPDCCH, signaling for the CCH type indication needs to be transmitted only to, e.g., scheduling cell(s) (including Pcell, master cell, or serving cell), and the scheduled cell(s) (including Scell, slave cell, or non-serving cell) might not require transmission of the CCH type indication. This is why the scheduled cells do not require CCH monitoring and thus do not require signaling on the indication.

Referring to FIG. 11, in case five carriers are aggregated, if C#1 is the cell scheduling C#2, and C#3 is the cell scheduling C#4 and C#5, the CCH type indication may be required only for C#1 and C#3. Here, the indication bit n for the CCH type indication may be 1 (or two bits). In contrast, the scheduled cells, C#2, C#4, C#5, do not require the indication bit.

Meanwhile, in case the LPDCCH or EPDCCH is supportive in the same sub-frame, different bits may be required. For example, if the LPDCCH cross carrier schedules C#2 in C#1, and the EPDCCH cross carrier schedules C#3, #4, and #5 in C#1, C#1 requires the indication bit to inform that the LPDCCH and EPDCCH are cross carrier scheduled, but the scheduled carriers, C#2, #3, #4, and #5, require no indication bits. Further, it may also be possible that the LPDCCH cross carrier schedules C#2 through C#1 and the EPDCCH cross carrier schedules C#4 and C#5 through C#3. In such case, C#1 and C#3 require the indication bit to be signaled to the scheduling cell. In contrast, the scheduled cell might not require the indication bit.

Here, the scheduled cell (here, the cell includes carrier in the meaning) configured to monitor only the LPDCCH or to schedule using only the LPDCCH may be excluded the CCH type indication, i.e., the monitoring control channel type indication target. That is, it may be configured to monitor the control channel type indication targeting only the scheduling cell configured to monitor the EPDCCH or to schedule using the EPDCCH.

Meanwhile, none of the scheduling cells may require the indication bit for the CCH type indication. The CCH type indication is defined only for the cell intending to schedule with the EPDCCH, and this also applies to the case where cross carrier scheduling is supportive. Further, upon self scheduling, none of the carriers(cells) may be subjected to CCH type monitoring, and it may be restrictively defined for necessary cells. Here, there may be signaling to indicate that the particular carrier is operated with only the LPDCCH or the particular carrier is implicitly determined by a separate rule.

For example, the eNB may inform the UE that C#1 schedules only with the LPDCCH, and an indicator may be configured to indicate whether it is of the CCH type for the cells, which may schedule with the EPDCCH, among the other scheduling cells. Here, the eNB informing the UE includes applying separate RRC signaling or a predetermined rule.

Figure 12:
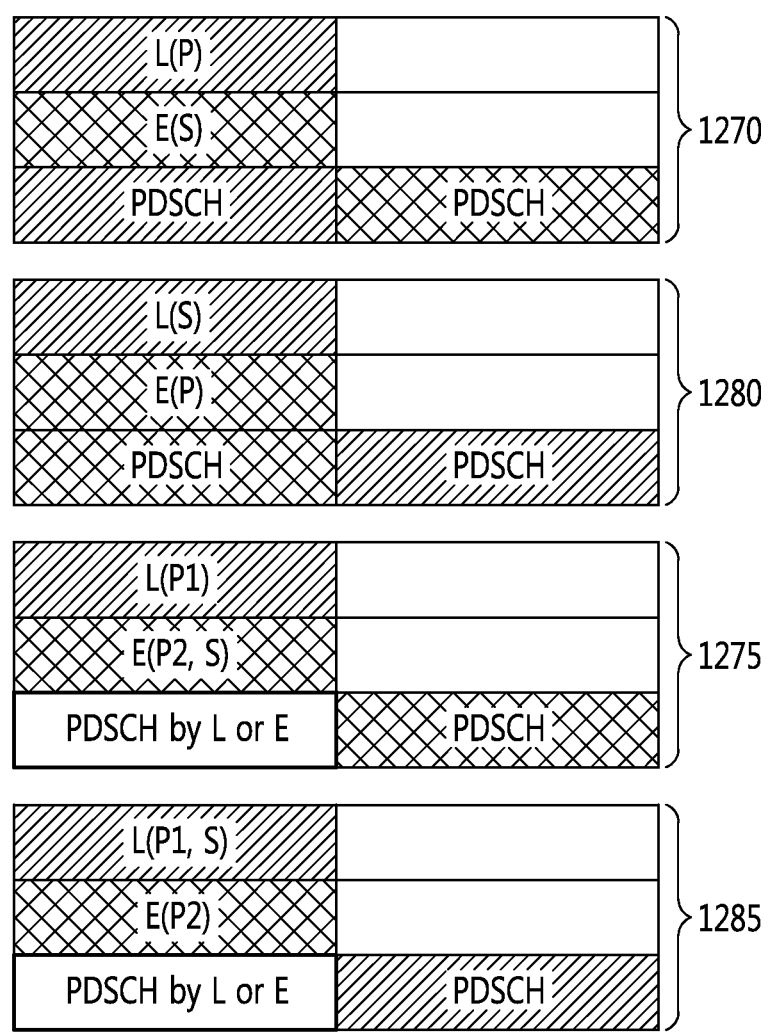
FIG. 12 is a view illustrating an example of supporting non-cross carrier scheduling for one control channel and cross carrier scheduling for another cross carrier scheduling according to the present invention.

FIG. 12 is a view illustrating an example of supporting non-cross carrier scheduling for one control channel and cross carrier scheduling for another cross carrier scheduling according to the present invention.

Referring to FIG. 12, 1270 indicates an example in which the L(P) transmitted to the Pcell schedules the Pcell PDSCH, and the E(S) of the Pcell cross carrier schedules the PDSCH of the Scell. In other words, the LPDCCH performs packet scheduling in the same cell, i.e., carrier/cell, and the EPDCCH schedules packets of other carrier/cell(s). This may apply to the case where the EPDCCH performs cross carrier scheduling under the situation where the LPDCCH or EPDCCH region of the Scell might not be used or cross carrier scheduling is difficult to conduct due to insufficient capacity of the LPDCCH.

1280 indicates an example in which the L(P) transmitted to the Pcell schedules the Scell PDSCH by cross carrier scheduling, and the E(P) transmitted to the Pcell self-schedules the Pcell PDSCH. This is the case where the LPDCCH, if CA is configured, performs cross carrier scheduling according to the legacy one, and in contrast, the EPDCCH performs scheduling only on the carrier or cell where it belongs or a designated carrier or cell if the EPDCCH does not or cannot conduct cross carrier scheduling. Here, 1275 and 1285 indicate the cases where the bandwidth BD is distinguished as P1 and P2 between the LPDCCH and the EPDCCH.

For this, the present invention may indicate the case of monitoring the LPDCCH and EPDCCH for self scheduling and cross carrier scheduling using a three-bit signal. Further, a hybrid indication may be used based on a predetermined rule along with the CCH type using a smaller number of bits than three bits. This may be defined to differentiate whether the LPDCCH should be monitored or the EPDCCH should be monitored by transmitting, through a higher layer signal, indication information indicating which one of the LPDCCH and the EPDCCH should be monitored and additional control information based on the indication information.

By way of example of the three-bit signaling, a sub-frame set for monitoring may be indicated in the form of a bitmap. For the bitmap, RRC signaling may be used (RRC signaling for monitoring subframes, bitmap indicates PDCCH or EPDCCH monitoring subframe set). Or, the case of monitoring the LPDCCH and EPDCCH of the Pcell or Scell depending on whether self scheduling and cross carrier scheduling has been configured may be defined, and the RRC signaling indicating the case may come in use (RRC signaling for the Case indication, 3 bit signal indicates N cases+K reserved states (N: valid cases, K: unused cases).

Hereinafter, the bitmap transmission of the extendable form according to variable CA combinations is described (Extendable bitmap signaling for variable carrier aggregation combination).

In the extended bitmap structure, a unique indication bit may be defined per cell, so that even when the number of cells increases, the signaling bit may be extended in the increasing form for a corresponding cell.

For example, if the Pcell defines an indication in M bits and the Scell defines an indication in N bits, in case there are five Scells, the number of signaling bits required is calculated in the form of M bit+N*5. The signaling bits may be applicable to turn into the RRC or MAC signaling form. Here, M and N rely on the degree by which information is transferred exactly, clearly, or stably. Use of the legacy method of relying on other control signal to implicitly infer from the signal may reduce the amount of information that should be explicitly transferred. However, an ambiguity, such as errors in the implicit transferring method or errors in signal interpretation, may arise, and thus, the number of bits may be variably set depending on the purpose of implementing the system.

In order to figure out the signaling bits, the information that should be indicated needs to be known first. For the Pcell, the information that should be informed is information as to whether the LPDCCH should be monitored or the EPDCCH should be monitored. As an example, in case the control channel type is informed by using new indication information configured in the Scell or Pcell, it is preferable to maintain the same period and parameter as the legacy bitmap signaling. From a period perspective, it may be advantageous in light of system management and operation to include other signals, rather than a single signal, or transfer in the form of a multiple of other period. In other words, if one bit is required for the case where the legacy bitmap is used for the Pcell, even when a separate indication bit is adopted without using the same, one bit is enough to indicate the L/E type, i.e., whether the LPDCCH is monitored or the EPDCCH is monitored.

However, the Scell encounters other situations than those of the Pcell, and one bit may be insufficient. Of course, this would not be problematic if the system is previously set to support only the cases corresponding to one bit, but such might pose limitations on the system operation. Accordingly, it would be preferable to allow the signaling design to be able to support the full flexibility.

Accordingly, the information that should be transferred should indicate whether the Scell should monitor the LPDCCH or the EPDCCH while simultaneously indicating where the LPDCCH or EPDCCH should be transmitted indeed. In other words, whether the LPDCCH or EPDCCH is transmitted to the Pcell or the Scell should be differentiated. Doing so would bear four cases, and may be implemented with an indication of minimally two bits.

As another example, if the legacy Scell has had a bitmap and has played a role to differentiate the LPDCCH or EPDCCH, only one more bit may be adopted to differentiate between the Pcell and the Scell to thus indicate four cases in association with the legacy one bit bitmap. For example, assuming that the legacy bitmap is interpreted to have the purpose to distinguish the LPDCCH or EPDCCH, the new one-bit bitmap may be interpreted to have the purpose to distinguish whether it is the Pcell or Scell (corresponding Scell), thus covering all the cases. The signaling adopted for the Scell may be rendered to have the same period and related parameters as the legacy bitmap signaling, but as mentioned above regarding the Pcell, may be designed to form a subset-form relation that forms a multiple-number relation.

Or, the bitmap of the Scell may be transmitted, not only through higher layer signaling such as RRC signaling, but also implicitly or explicitly through other channel (new or legacy PBCH, SCH and paging) receivable right before PDCCH decoding like system information signals, and this may also be true for the Pcell. Or, the control channel type or resource region supposed to be monitored by the UE may be previously determined without separate signaling by previously designating a rule in association with the sub-frame type or sub-frame number (or SFN, radio frame number, TDD sub-frame configuration).

FIG. 13 is a view schematically illustrating a configuration of RRC signaling according to the present invention.

Referring to FIG. 13, 1310 indicates a new RRC signaling structure according to the present invention, indicating, through one bit, which one of the LPDCCH and the EPDCCH the Pcell should monitor. Further, the two-bit indication corresponding to the configured Scell indicates whether it should monitor the LPDCCH or EPDCCH by the Pcell or by the Scell. In this case, the two bits are increased corresponding to the configured Scell. As an example, in case two Scells are added, the monitoring of the corresponding control channel may be indicated with a total of five bits.

In contrast, 1320 indicates an example in which the LPDCCH or EPDCCH is differentiated using the one-bit legacy bitmap configured in each cell, and the newly added one bit bitmap is used to differentiate the Pcell or the Scell. Accordingly, the number of bits is increased by two bits. Here, 1310 and 1320 are fundamentally the same operation, but differ in that the number of newly used bits is varied.

Figure 14:
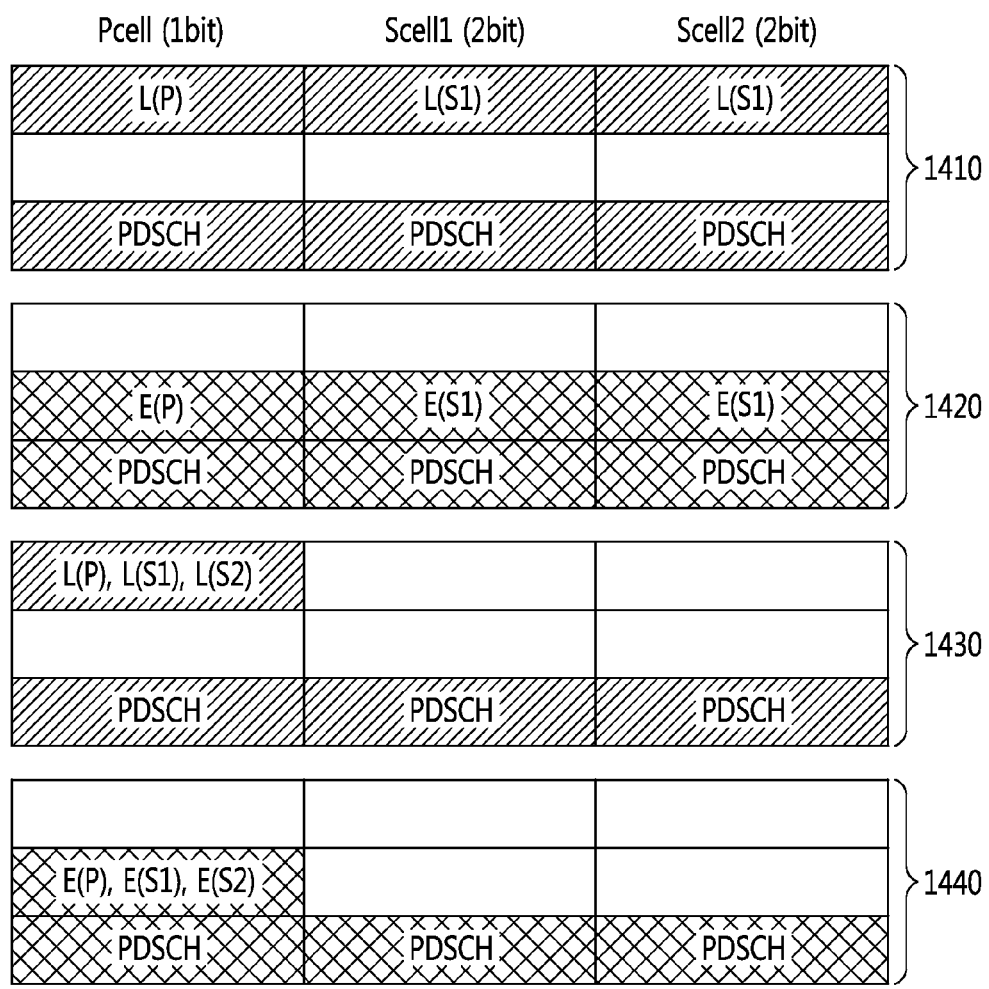
FIGS. 14 to 16 are views illustrating an example of monitoring a control channel as per non-cross/cross carrier scheduling according to an embodiment of the present invention.
Figure 15:
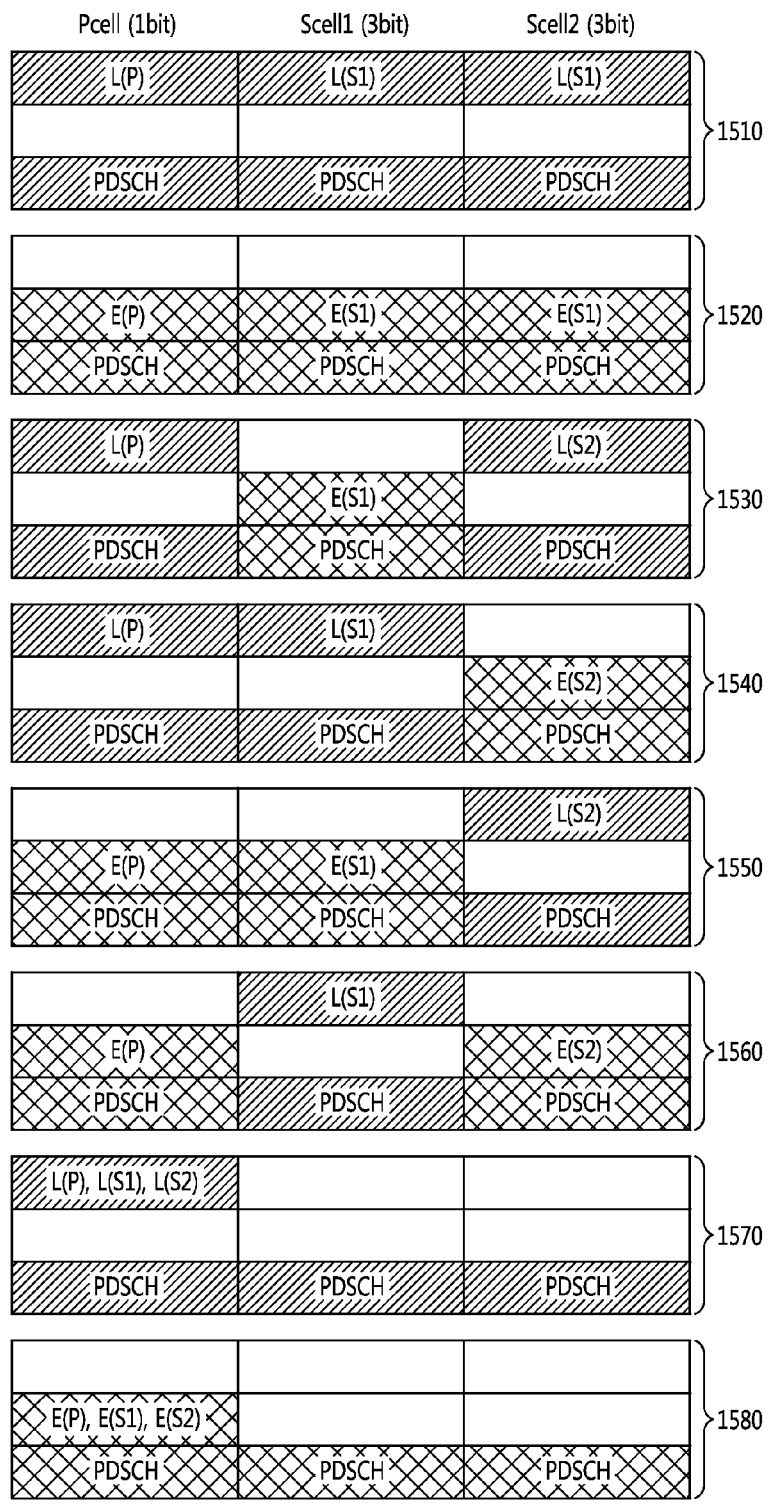

FIGS. 14 and 15 are views schematically illustrating the configuration of a control channel depending on non-cross carrier scheduling/cross carrier scheduling according to the present invention. As an example, in case there are one Pcell and two Scells, the figures disclose a method for monitoring the LPDCCH or EPDCCH. Described are how the LPDCCH or EPDCCH is to be configured in the Pcell or Scell and the case of self scheduling and the case of cross scheduling.

Referring to FIG. 14, 1410 indicates the case where cell-independent self scheduling is performed, and all the cells are configured to monitor only the LPDCCH. Here, the PDSCH is the one scheduled by the LPDCCH. 1420 indicates the case where all the cell EPDCCHs are monitored and the PDSCH is scheduled by the EPDCCH. 1430 indicates the case where cross carrier scheduling is configured, and all the LPDCCHs are present in the Pcell. 1440 indicates the case where cross carrier scheduling is configured, and all the EPDCCHs are configured in the Pcell. Here, in case cross carrier scheduling and self scheduling, i.e., non-cross carrier scheduling, are configured and differentiated in a higher layer according to the present invention, each Scell may need only one bit, not two bits. This is done by allowing each Scell only to distinguish the LPDCCH or EPDCCH.

In contrast, under the circumstance where the configuration is dynamically changed, like cross carrier scheduling and self scheduling are frequently activated or deactivated or when no separate cross carrier scheduling is configured, the semi-static signal by the RRC might be inappropriate. In such case, the Scell may enable the dynamic configuration change and increase system efficiency by informing, with the bitmap at constant periods, self scheduling or cross carrier scheduling as well as the L/EPDCCH differentiation using two bits. In the environment like small cells, the scheduling policy may be frequently changed due to various interference sources, and thus, such type of operation methods may have increased necessity. Here, 1410 to 1440 may be designed, configured, and operated in separate bitmap forms. That is, the period or other parameters may be independently configured.

Referring to FIG. 15, described are the case where all the Scells are configured with the LPDCCH or EPDCCH along with the case where Scell 1 is configured with the LPDCCH, and Scell 2 with the EPDCCH, and vice versa. Of course, the above-described six cases, i.e., the method of bundling up the self scheduling cases indicated by 15610 to 1560 to indicate with one control information bit, may be added with the representative two cases for cross carrier scheduling, forming a total of eight cases to configure a three-bit signaling bitmap. Here, although the two cases may be unnecessary if a cross carrier scheduling configuration is present, in order for operation in the self carrier scheduling mode corresponding to 15110 to 1560 in a particular sub-frame although the cross carrier scheduling has been configured, or in order for operation in the cross carrier scheduling in the particular sub-frame although configured in the self carrier scheduling, a number of cases may be configured including both of the two scheduling types, and an indication may be configured with one bitmap (in this case, three bits).

Here, 1510 defines the case where Pcell, Scell1, and Scell2 each are configured with the LPDCCH (000), 1520 the case where Pcell, Scell1, and Scell2 each are configured with the EPDCCH (001), 1530 the case where Pcell and Scell2 each are configured with the LPDCCH, and Scell1 is configured with the EPDCCH (010), 1540 the case where Pcell and Scell1 each are configured with the LPDCCH, and Scell2 is configured with the EPDCCH (011), 1550 the case where Pcell and Scell1 each are configured with the EPDCCH, and Scell2 is configured with the LPDCCH (100), and 1560 the case where Pcell and Scell2 each are configured with the EPDCCH, and Scell1 is configured with the LPDCCH (101). 1570 defines the case where cross carrier scheduling applies so that in Pcell the LPDCCH is configured for Scell1 and Scell2 (110), and 1580 the case where cross carrier scheduling applies so that in Pcell the EPDCCH is configured for Scell1 and Scell2 (111). Each case is configured with a bit value determined through the three-bit indication and is indicated to the UE. Accordingly, the UE distinguishes among the 1510 to 1580 cases through the bit value determined by the corresponding bitmap, and monitors the EPDCCH or LPDCCH through the corresponding serving cell in the corresponding sub-frame according to the configured cases.

Figure 16:
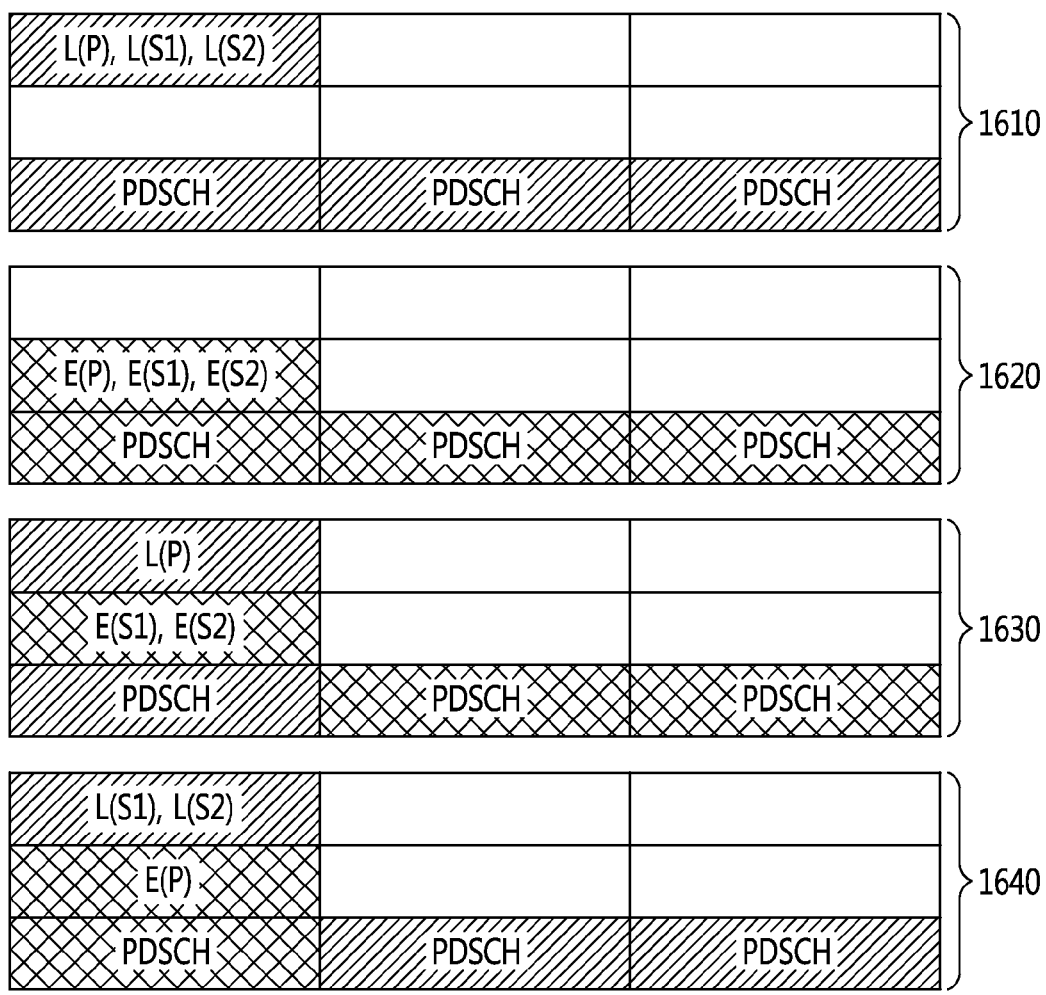

FIG. 16 illustrates an example of a method for monitoring control channels in case only cross carrier scheduling is present according to an embodiment of the present invention.

Referring to FIG. 16, in case cross carrier scheduling is configured, an example is shown of indicating the channel type of the PDCCH by which Pcell, Scell1, and Scell2 are scheduled. 1610 and 1620 indicate the case where all the cells each are cross carrier scheduled with the LPDCCH 1610 or the EPDCCH 1620. In contrast, 1630 and 1640 are the cases where Pcell and Scell are cross carrier scheduled in different downlink control channel types. In this case, two bits are required per Scell. Of course, in case Pcell and Scell do not support cross carrier scheduling in different downlink control channel types, 1610 and 1620 may be distinguished by one-bit signaling.

Now described are a parameter set for a multi-EPDCCH search space configuration considering aggregation of carriers (cells) with different bandwidths and a scheme signaling the same (Multiple EPDCCH SS configuration parameter set signaling considering different BW carrier aggregation or cell aggregation).

As an example, each carrier (cell) has a different bandwidth, like Pcell has bandwidth1 (BW1), Scell1 a bandwidth (BW2), and Scell2 a bandwidth (BW3), and thus, has a different PDCCH/EPDCCH DCI format length. Further, there may thus come the situation where one or more parameters (N and K in EPDCCH, where N=number of PRBs in set, and K=number of SS sets) should be varied which have to be considered upon configuring a search space (SS). In this case, among the parameters, some (parameters associated with system bandwidth) should be varied while others (not associated with the system bandwidth but changes thereto are favored in some cases) should be adaptively varied in the system environment for system efficiency. When such set of parameters is denoted a parameter set, in case the system bandwidth is varied, it is preferable to change the SS parameter set also. This may be described in connection with FIGS. 17 and 18.

For example, it might not be said to be preferable that in a particular sub-frame where the EPDCCH is monitored in BW2 (Scell1) and BW1 gets to monitor Pcell by cross carrier scheduling, blind decoding is carried out based on the same parameter set as the EPDCCH parameter set of Scell1. Further, there may be the case there the BW gap is large or the BW of a cell is too small so that the parameters such as N and K should be forced to be varied. Here, it is preferable to determine a search space configuration (parameter set) considering the RS configuration along with the type of sub-frame.

A special method is required to inform the varied parameter set (this is not limited to the SS parameter set) to the UE for such purpose. For example, three carriers (Pcell, Scell1, and Scell2) are left configured through self scheduling based on the EPDCCH at time=0. In case cross carrier scheduling is conducted at time=K, the EPDCCHs of all the carriers/cells are gathered in the Pcell and transmitted. In this case, there may be the situation where E1 (the EPDCCH SS parameter set configured in BW2 Scell1 @ time=0) and E2 (the EPDCCH SS parameter set configured in BW3 Scell2 @ time=0) apply, as are, to the BW1 Pcell, and thus, should be properly configured with a search space by separate E1 and E2 parameters considering all the situations of BW1 and Pcell SS configuration.

To that end, according to the present invention, a multi-EPDCCH SS parameter set is transmitted through RRC to be flexibly handled under the self or cross carrier scheduling circumstance dynamically or semi-dynamically varied. This is as shown in FIG. 17.

FIG. 17 is a view schematically illustrating a search set for monitoring a control channel upon performing cross carrier scheduling according to the present invention. That is, the UE recognizes the self or cross carrier scheduling circumstance, and accordingly, selects one of multiple EPDCCH SS parameter sets, and performs blind decoding based on the selected one. This retains information on the parameter set, recognizes the scheduling type based on the sub-frame, and selects a proper EPDCCH SS set to fit the sub-frame and operates, thus enhancing the overall system performance. Here, [E1] or [E2] represents use of a parameter set other than E1 or E2 as configured before (1720). Here, it is not necessary to use the other set. In such case, the multiple SS set parameters have the same value or rendered to be shared by multiple cells (carriers) through one single signaling. Although the description has focused on BW as an example, even when the BW is not changed, it may be more advantageous to operate the system using multiple SS set parameters dependent per cell (carrier).

In case the LPDCCH/EPDCCH is frequently changed between cells (carriers), even when the BW for each cell is not different, an optimized parameter set may be configured for each cell, and when the cell (carrier) is changed, one of the configured sets may be selected and applied (1730). The UE is operated to select a set fitting the system circumstance such as sub-frame type, transmission mode (TM mode), or available RE, in relation to the cell (carrier) dependency. Further, the system may be configured in the form that the UE may dynamically make a choice using multiple SS parameters even within one carrier although there are not multiple carriers. This includes use of other parameter set where even E has been converted, considering that E1 or E2 as configured before is also changed.

Such method is material in that the situation is likely be more frequent where the EPDCCH search space parameter configured based on RRC might not properly reflect the dynamic channel environment or ambient environment. In other words, adaptive selection (the multi-SS parameter set) is said to be more critical under the circumstance where the EPDCCH, in light of its nature, cannot be rendered to be positioned in a fixed resource region unlike the PDCCH. Here, it also includes the case where the cell (carrier) is differentiated with a virtual cell identifier (ID). Of course, the transmission point is included. Or, it is also true for the case with the same cell ID but different transmission points. Further, in case the data path and control path are configured to be different from each other, it may be applied fitting the cell/carrier/transmission point to which each corresponds.

Hereinafter, in case self scheduling is conducted per carrier under the CA circumstance, the EPDCCH set(s) may be independently configured per cell. In case in one cell two EPDCCH SS sets are configured, which are respectively configured with four PRB pairs and eight PRB pairs, this is denoted K=2, N1=4, and N2=8.

As a specific example, K may come in two detailed attributes, targeting localized transmission or distributed transmission. These are denoted KL and KD, respectively. Accordingly, one cell may have parameters: {KL, KD, N1, N2}. In case five carriers are aggregated, the parameter to represent the EPDCCH SS set is as shown in Table 3 below. The SS sets are transmitted in the EPDCCH resources of the carriers. This includes extension of EPDCCH SS parameter as defined in one legacy carrier.

TABLE 3

Cell1-[KL, KD, N1$_1$, N2$_1$] for Cell1 EPDCCH Search Space Sets
Cell2-[KL, KD, N1$_2$, N2$_2$] for Cell2 EPDCCH Search Space Sets
Cell3-[KL, KD, N1$_3$, N2$_3$] for Cell3 EPDCCH Search Space Sets
Cell4-[KL, KD, N1$_4$, N2$_4$] for Cell4 EPDCCH Search Space Sets
Cell5-[KL, KD, N1$_5$, N2$_5$] for Cell5 EPDCCH Search Space Sets Meanwhile, when cross carrier scheduling is performed, the EPDCCH is transmitted to the Pcell (i.e., the serving cell, reference cell, or scheduling cell), and no EPDCCH may be transmitted to the scheduled cell. In other words, the EPDCCH SSs of all the cross carrier scheduled cells may be configured in the Pcell. This may be shown in the form of FIG. 18. In such case, there may come the situation where all the EPDCCH SS sets independently configured in each cell should be configured in the Pcell. This may lead individual configuration of Cell1~Cell5-{KL, KD, N1, N2} to inefficient use of resources as shown in Table 3 above.

Accordingly, it is preferable to bundle the sets with the common attribute into one set so that the EPDCCH candidate set of the aggregated cells can be shared. If all the aggregated cells have the same K value, 2, and Set#1 and Set#2 are being used or supposed to be used for localized transmission and distributed transmission, respectively, the EPDCCH DCI formats to schedule the localized transmissions of all the cells may be configured to be transmittable in Set#1, and in the case of distributed transmission, configurable in Set#2.

Here, in case N and K differ per cell and the purpose of cell also differs, the above operating method may be changed considering in which set and in what count of blind decoding the candidate set of each cell is configured in the Pcell. Accordingly, in case there is the sub-frame (or time period or sub-frame set) where cross carrier scheduling is deactivated or inapplicable according to system circumstances even when cross carrier scheduling has been configured, it may be switched to self-scheduling mode so that the EPDCCH is transmitted in the region previously configured in each cell (by high layer signal), and if the sub-frame comes where cross carrier scheduling may be applied, the EPDCCH is rendered to be transmitted in the EPDCCH SS set configured in the Pcell, enabling the operation to go on while dynamically switching between cross carrier scheduling and non-cross carrier scheduling.

As described above, according to the present invention, the number of EPDCCH SS sets may be reduced, so that several cells may share one sell. For example, assuming that self scheduling is carried out, and two cells each need two SS sets, i.e., a total of four SS sets, the sub-frame to do cross carrier scheduling may be designed to accommodate the candidates of the two cells using only two SS sets. This increases N configured in each set.

As an example, in case PCell Set size is predefined as N={4, 6, 8, 12, 16}, and the sets with the same attribute are summed up, the form as shown in Table 4 below may be configured.

TABLE 4

EPDCCH SS parameter configuration in Non-cross carrier scheduling
 Cell1-[KL, KD, N1 = 2, N2 = 8]
 Cell2-[KL, KD, N1 = 4, N2 = 4]
EPDCCH SS parameter configuration in Cross carrier scheduling
 PCell1-[KL, KD, N1 = 6, N2 = 12]

According to the present invention, although the values are summed up for example, this may be changed to the form of mapping to a value closest to a predetermined number. If the size of set configurable in non-cross carrier scheduling is {2, 4, 8}, the size of set configurable in the Pcell may be defined as a predetermined set size, such as {4, 6, 8, 12, 16} or {4, 8, 16}. That is, a value equal or smaller than the size sum of aggregated sets may be selected or a value closest thereto may be selected.

As another example, in case PCell Set size is predefined as N={4, 8, 16}, and the sets with the same attribute are summed up, the form as shown in Table 5 below may be configured.

TABLE 5

EPDCCH SS parameter configuration in Non-cross carrier scheduling
 Cell1-[KL, KD, N1 = 4, N2 = 8]
 Cell2-[KL, KD, N1 = 4, N2 = 4]
EPDCCH SS parameter configuration in Cross carrier scheduling
 PCell1-[KL, KD, N1 = 8, N2 = 16]

In this case, if more and more cells are aggregated, more combinations are possible to diversify the Pcell set size. However, N may be limited to several particular values in order to facilitate to design the position of candidate sets and signaling.

For example, like, in case N is always a multiple of 4, and two cells are aggregated, {4, 8, 12}, and in case three cells are aggregated, {8, 12, 16}, it may be designed to have a one-step shifted value. Here, K may be also taken into account. That is, in case four or more cells are aggregated, K may be increased to, e.g., 3 or 4. In other words, it may be designed in such a rule that for three or less carriers, K=2 and N={predefined set}, and for four or more carriers, K=4 and N={predefined set}. K and N may be determined given massive CA in the future. That is, once the respective bandwidths of aggregated carriers are determined, K may be increased whenever exceeding K_threshold and N may be increased whenever exceeding N_threshold based on the determined bandwidths. K_threshold and N_threshold may be operated in association with the number of PRBs of the aggregated carriers. Or, those may be operated with one threshold as well.

Figure 18:
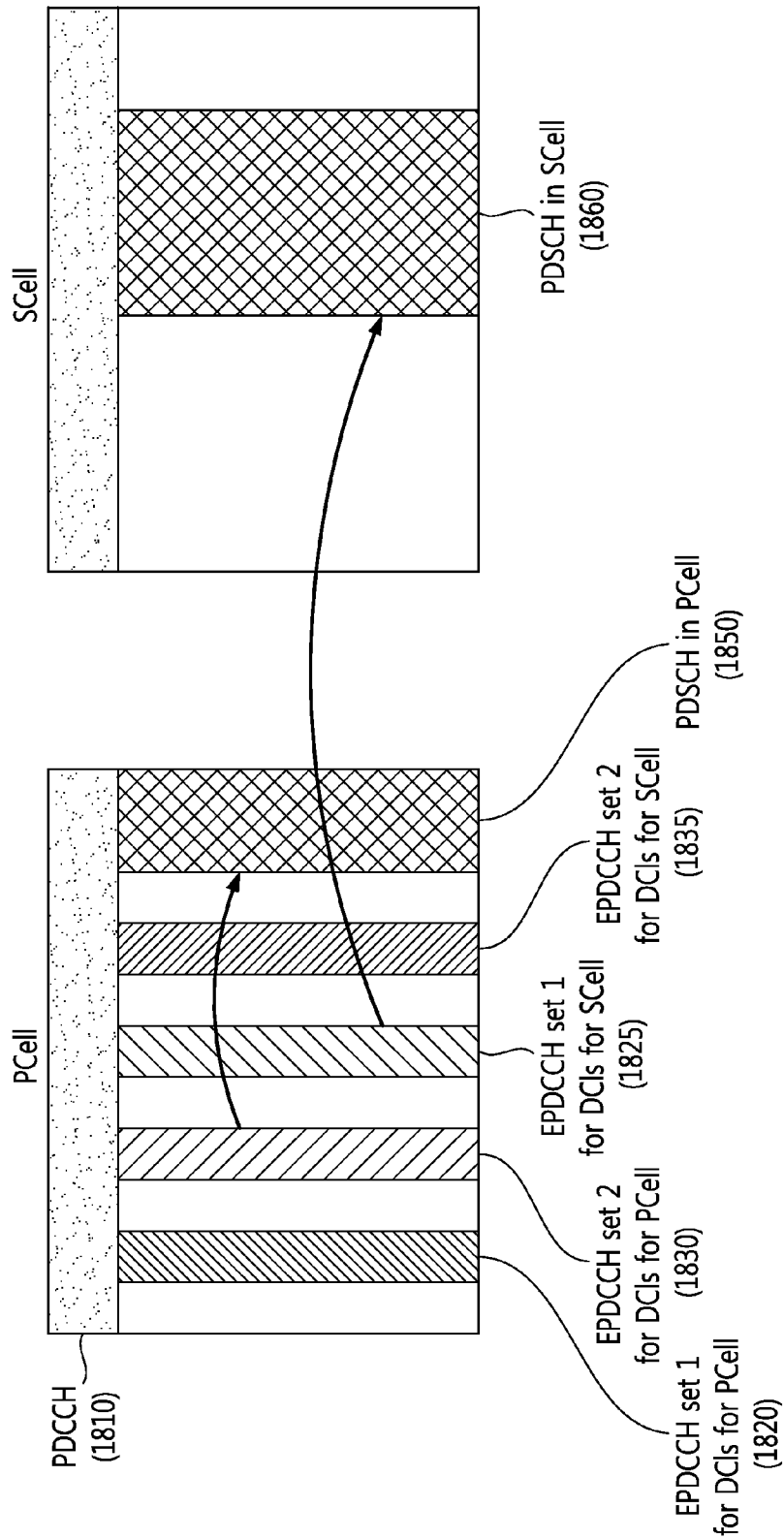

Referring to FIG. 18, the DCI for Pcell is configured with EPDCCH candidate sets Set#1(1820) and Set#2(1830), and the DCIs for Scells are configured with EPDCCH candidate sets Set#1(1825) and Set#2(1835). In this case, the PDSCH 1850 of Pcell has been scheduled with EPDCCH Set#2 for Pcell, and the PDSCH 1860 of Scell has been scheduled with EPDCCH Set#1 for Scell. This includes each cell being able to have a different DCI format and an EPDCCH SS with a different length. In other words, each may have a different DCI format, and the Pcell may have the largest format. In this case, as described above, in case each cell has the EPDCCH SS set in the form of being shared, as an example, like performing self scheduling, two cells each need two SS sets, i.e., a total of four SS sets.

Here, in relation to the EPDCCH SS parameter, all the parameters are valid for each cell by higher layer signaling. This means that the EPDCCH SS parameter is useful and clearly applicable to self scheduling, i.e., non-cross carrier scheduling, but upon actual cross carrier scheduling, the EPDCCH SS parameter needs to be more clearly defined. This is why the purpose of introducing EPDCCH is to increase the capacity of control channel, and considering this, use of the EPDCCH SS parameter upon cross carrier scheduling, i.e., efficient use of control channel resources is needed.

That is, this means that the definition of EPDCCH upon cross carrier scheduling requires a more efficient use of EPDCCH resources as compared with self scheduling. As an example, in the case of defining EPDCCH resource parameter, K(number of EPDCCH sets), and $N_k$ (number of PRB pairs), the resources for EPDCCH are increased according to K or the number ($N_k$) of PRB pairs constituting each EPDCCH set. Accordingly, in case two CCs are aggregated as shown in FIG. 18, the base station configures two EPDCCH parameter sets, and configures these as search spaces of DCIs to be transmitted for each CC. Here, each EPDCCH parameter set is configured in the same format as self scheduling. As an example, in case each EPDCCH parameter set includes two EPDCCH candidate sets, a total of four EPDCCH sets are configured for the two CCs.

In this case, in case one of particular aggregated CCs is activated/deactivated by the base station, the search space, i.e., the EPDCCH parameter set according to other CC, might not be influenced. As another example, in case the two aggregated CCs have different TDD UL/DL configurations, the EPDCCH set is adaptively operated in deactivation, and accordingly, the PDSCH for the CC is allocated without transmitting separate DL allocation and UL allocation in a particular sub-frame, thus enabling efficient operation.

Figure 19:
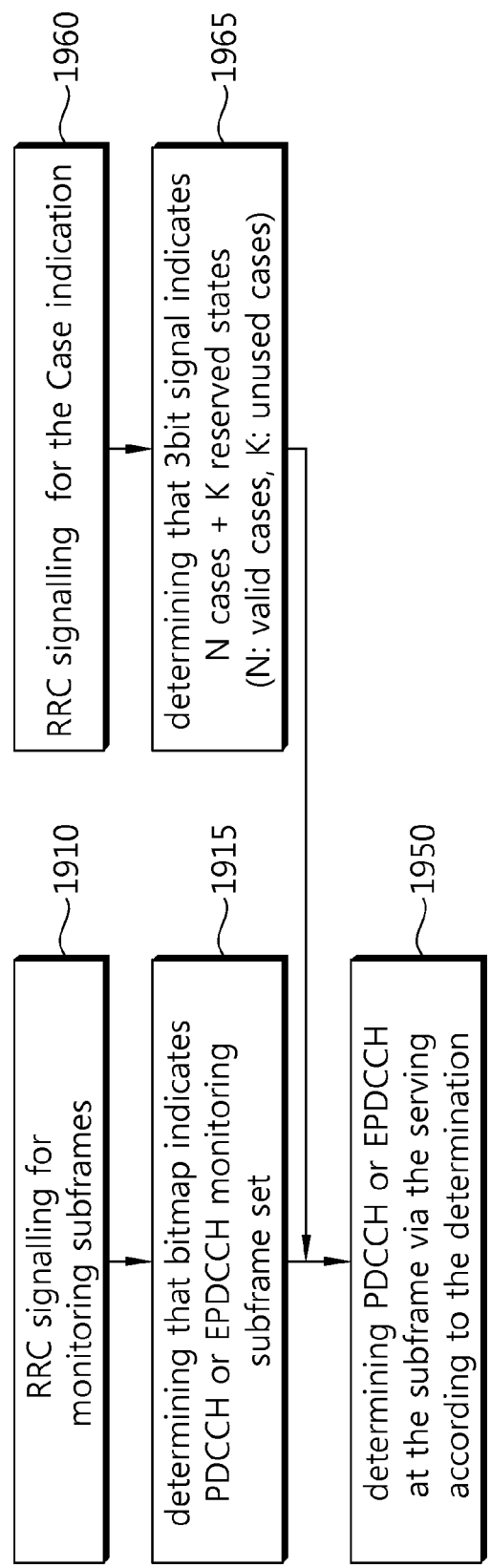
FIG. 19 is a view illustrating a signal flow for monitoring a downlink control channel according to the present invention.

FIG. 19 is a view illustrating a signal flow for monitoring a control channel by a UE according to the present invention.

Referring to FIG. 19, first, the UE is in the state of having configured at least one or more Scells including a Pcell for carrier aggregation through radio resource control (RRC) configuration with the base station. The RRC configuration includes, as cell index (sCellIndex) and cell identification information (cellIdentification), physical cell identification information (physCellId), DL carrier frequency (dl-CarrierFreq) information, and per-cell radio resource information (radioResourceConfigCommonSCell). The RRC configuration includes information on the configuration for cross carrier scheduling and the configuration for EPDCCH. Here, the EPDCCH includes transmission type or RB allocation information. Accordingly, the UE is in the state of recognizing a determined search space and optimized EPDCCH search space (Multiple EPDCCH SS configuration parameter set) for monitoring the PDCCH and the EPDCCH.

The UE receives information including indication information on the sub-frames for monitoring a newly determined downlink control channel according to the present invention (1910). The indication information is defined as a combination of an indication bit indicating the channel type information on the downlink control channel, i.e., whether to monitor the LPDCCH or the EPDCCH, and an indication bit indicating whether the corresponding downlink control channel is for Pcell or Scell according to the configuration of cross carrier scheduling.

The UE identifies the monitoring combination considering whether cross carrier scheduling is configured for the Pcell and Scell and LPDCCH and EPDCCH through a predetermined length of bitmap configuring the indication information by identifying the indication information (1915).

Thereafter, the UE monitors and receives the determined downlink control channel in the determined search space (i.e., sub-frame) in the corresponding serving cell according to the monitoring combination indicated by the indication information (1950). Here, the UE may further identify the DL resource scheduled through the downlink control channel and receives the packet data from the PDSCH indicated by the identified DL resource.

Accordingly, the UE, which has recognized the search space and the parameter set for the search space to receive each control channel through the signal for the RRC configuration, may be signaled with the indication bit for the monitoring combination determined as the combination for the cell and the type for the downlink control channel to more quickly receive the legacy and extended control channel and resultantly the data channel.

In contrast, in case the UE operates in non-cross carrier scheduling mode according to another embodiment of the present invention, the UE receives indication information with a predetermined monitoring set, including the monitoring set defined to be able to operate in cross carrier scheduling mode in the particular sub-frame and the six monitoring sets for the LPDCCH and the EPDCCH and the Pcell and the Scell, i.e., previously considering the dynamic scheduling (1960).

The UE identifies the indication information, i.e., when indicated by the indication information, identifies the monitoring set (1965). In other words, the UE identifies the case indicated by the bit of the bitmap of the indication information among the two monitoring sets distinguished by cross carrier scheduling and the monitoring set differentiated by self scheduling and identifies the corresponding downlink control channel and the position of the Pcell and the Scell. Accordingly, it goes to step 1950.

Figure 20:
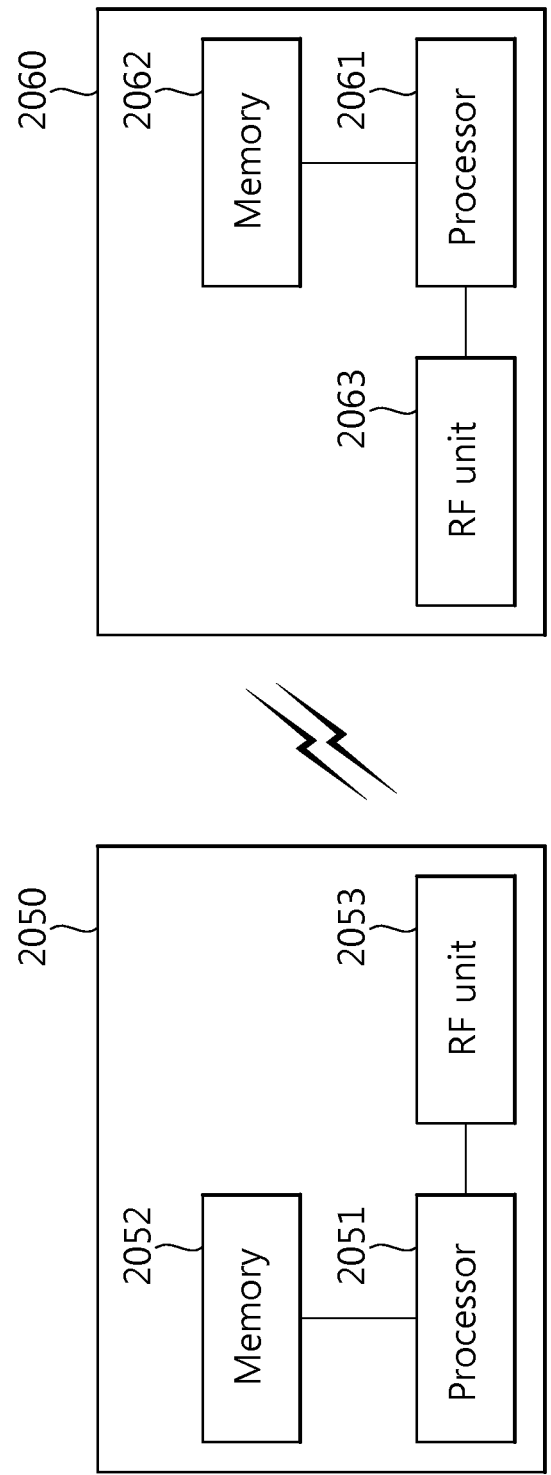
FIG. 20 is a block diagram illustrating a wireless communication system where an embodiment of the present invention is implemented.

FIG. 20 is a block diagram illustrating a wireless communication system where an embodiment of the present invention is implemented.

The base station 2050 includes a processor 2051, a memory 2052, and an RF (radio frequency) unit 2053. The memory 2052 is connected with the processor 2051 and stores various types of information for driving the processor 2051. The RF unit 2053 is connected with the processor 2051 and communicates radio signals. The processor 2051 implements functions, processes, and/or methods as proposed herein. In the above-described embodiments, the operation of the base station may be implemented by the processor 2051. The processor 2051 configures an indication or bitmap for monitoring the EPDCCH and/or PDCCH and may transmit the EPDCCH and/or PDCCH through the corresponding cell of the corresponding sub-frame.

The UE 2060 includes a processor 2061, a memory 2062, and an RF unit 2063. The memory 2062 is connected with the processor 2061 and stores various types of information for driving the processor 2061. The RF unit 2063 is connected with the processor 2061 and communicates radio signals. The processor 2061 implements functions, processes, and/or methods as proposed herein. In the above-described embodiments, the operation of the wireless device may be implemented by the processor 2061. The processor 2061 identifies the indication or bitmap for monitoring the EPDCCH and/or the PDCCH, identifies the configuration of the EPDCCH and/or PDCCH according to the identified indication information and bitmap, and may monitor and receive the configured EPDCCH and/or PDCCH in the corresponding cell of the corresponding sub-frame. Accordingly, the demodulation of the PDSCH may be efficiently performed through the adaptively configured control channels.

The processor may include an ASIC (application-specific integrated circuit), other chipset, a logic circuit, and/or a data processing device. The memory may include a ROM (Read-Only Memory), a RAM (Random Access Memory), a flash memory, a memory card, a storage medium, and/or other storage device. The RF unit may include a baseband circuit for processing radio signals. When an embodiment is implemented in software, the above-described schemes may be embodied in modules (processes, or functions, etc.) performing the above-described functions. The modules may be stored in the memory and executed by the processor. The memory may be positioned in or outside the processor and may be connected with the processor via various well-known means.

In the above-described example system, the methods are described based on the flowcharts with a series of steps or blocks, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

What is claimed is:

1. A method for monitoring a control channel in a wireless communication system, the method comprising:
receiving, by a user equipment (UE), indication information including channel type information indicating a type of a downlink control channel to be monitored and cell information indicating a cell for monitoring the downlink control channel; and
monitoring, by the UE, the downlink control channel having the type indicated by the channel type information in the cell indicated by the cell information,
wherein the indication information is defined with a length varying depending on a configuration of cross carrier scheduling,
wherein the type of the downlink control channel includes a physical downlink control channel (PDCCH) or an enhanced physical downlink control channel (EPDCCH), and
wherein the indication information is defined with a length varying depending on a number of secondary cells aggregated according to carrier aggregation.

2. The method of claim 1, wherein the cell information distinguishes whether the cell for monitoring the downlink control channel is a primary cell or a secondary cell.

3. The method of claim 1, wherein the indication information is received through a radio resource control (RRC) signal in a form of a bitmap.

4. The method of claim 1, further comprising:
identifying an activation or a deactivation for the configuration of the cross carrier scheduling; and
monitoring, by the UE, an EPDCCH configured in a primary cell by using a search space set of the EPDCCH configured in the primary cell, or monitoring an EPDCCH configured in each cell by using a search space set of the EPDCCH configured in each cell,
wherein the search space set of the EPDCCH configured in the primary cell has a variable set size by the secondary cells aggregated.

5. The method of claim 4, wherein the search space set of the EPDCCH configured in the primary cell, when the configuration of the cross carrier scheduling is activated, has a size equal to a sum of search space sets of EPDCCHs configured in at least one or more secondary cells aggregated or a size equal to a predetermined multiple of 4 or 8.

6. An apparatus for monitoring a control channel in a wireless communication system, the apparatus comprising:
a transceiver to transmit and receive a radio signal; and
a processor connected with the transceiver, the processor performing control to:
identify indication information including channel type information indicating a type of a downlink control channel to be monitored and cell information indicating a cell for monitoring the downlink control channel, and
monitor the downlink control channel having the type indicated by the channel type information in the cell indicated by the cell information,
wherein the indication information is defined with a length varying depending on a configuration of cross carrier scheduling,
wherein the type of the downlink control channel includes a physical downlink control channel (PDCCH) or an enhanced physical downlink control channel (EPDCCH), and
wherein the indication information is defined with a length varying depending on a number of secondary cells aggregated according to carrier aggregation.

7. The apparatus of claim 6, wherein the channel type information distinguishes whether the downlink control channel is the PDCCH or the EPDCCH.

8. The apparatus of claim 6, wherein the cell information distinguishes whether the cell for monitoring the downlink control channel is a primary cell or a secondary cell.

9. The apparatus of claim 6, wherein the indication information is received through a radio resource control (RRC) signal in a form of a bitmap.

10. The apparatus of claim 6, wherein the processor is configured to:
- identify activation or deactivation for a configuration of the cross carrier scheduling, and
- monitor an EPDCCH configured in a primary cell by using a search space set of the EPDCCH configured in the primary cell, or monitor an EPDCCH configured in each cell by using a search space set of the EPDCCH configured in each cell,
- wherein the search space set of the EPDCCH configured in the primary cell has a set size varied by the secondary cells aggregated, and
- wherein the set size is equal to a sum of search space sets of EPDCCHs configured in at least one or more secondary cells aggregated or a size equal to a predetermined multiple of 4 or 8.

* * * * *